(12) United States Patent
Taniguchi

(10) Patent No.: US 12,305,703 B2
(45) Date of Patent: May 20, 2025

(54) TAPERED ROLLER BEARING AND CAGE

(71) Applicant: JTEKT CORPORATION, Kariya (JP)

(72) Inventor: Youzou Taniguchi, Kariya (JP)

(73) Assignee: JTEKT CORPORATION, Kariya (JP)

( * ) Notice: Subject to any disclaimer, the term of this patent is extended or adjusted under 35 U.S.C. 154(b) by 202 days.

(21) Appl. No.: 18/028,885

(22) PCT Filed: Mar. 22, 2021

(86) PCT No.: PCT/JP2021/011768
§ 371 (c)(1),
(2) Date: Mar. 28, 2023

(87) PCT Pub. No.: WO2022/074862
PCT Pub. Date: Apr. 14, 2022

(65) Prior Publication Data
US 2023/0332640 A1 Oct. 19, 2023

(30) Foreign Application Priority Data
Oct. 6, 2020 (JP) ................ 2020-169083

(51) Int. Cl.
*F16C 19/36* (2006.01)
*F16C 33/46* (2006.01)
F16C 33/36 (2006.01)

(52) U.S. Cl.
CPC ........ *F16C 19/364* (2013.01); *F16C 33/4635* (2013.01)

(58) Field of Classification Search
CPC .. F16C 33/4635; F16C 33/366; F16C 19/364; F16C 33/467–4682; F16C 33/6651; F16C 33/4623; F16C 33/4617; F16C 33/46
See application file for complete search history.

(56) References Cited

U.S. PATENT DOCUMENTS

| 2014/0003757 A1 | 1/2014 | Schulz |
| 2016/0281774 A1* | 9/2016 | Nagai ................ F16C 19/364 |
| 2020/0116197 A1 | 4/2020 | Taniguchi et al. |

FOREIGN PATENT DOCUMENTS

| JP | 2002-310163 A | 10/2002 |
| JP | 2009-063102 A | 3/2009 |
| JP | 2013-221592 A | 10/2013 |
| JP | 2016-169747 A | 9/2016 |
| JP | 2019-065880 A | 4/2019 |
| JP | 2020-060275 A | 4/2020 |

* cited by examiner

*Primary Examiner* — John Olszewski
*Assistant Examiner* — Aimee Tran Nguyen
(74) *Attorney, Agent, or Firm* — Oliff PLC

(57) ABSTRACT

A tapered roller bearing includes: an inner ring; an outer ring; a plurality of tapered rollers in rolling contact with an inner and an outer ring raceway; and an annular cage that has a plurality of pockets for accommodating the tapered rollers. The cage has a plurality of first lateral faces respectively facing outer peripheral surfaces of the tapered rollers respectively accommodated in the plurality of pockets from a first side in a circumferential direction of the cage and a plurality of second lateral faces respectively facing the outer peripheral surfaces from a second side in the circumferential direction of the cage. The plurality of pockets includes a first pocket with a first angle as an angle formed by the first and second lateral faces, and a second pocket that has a second angle smaller than the first angle as the angle formed by the first and second lateral faces.

8 Claims, 22 Drawing Sheets

( FIRST SIDE ⟵ AXIAL DIRECTION ⟶ SECOND SIDE )

( FIRST SIDE ⟵ AXIAL DIRECTION ⟶ SECOND SIDE )

(FIRST SIDE ←—— AXIAL DIRECTION ——→ SECOND SIDE)

(FIRST SIDE ←—— AXIAL DIRECTION ——→ SECOND SIDE)

TAPERED ROLLER BEARING AND CAGE

TECHNICAL FIELD

The present disclosure relates to a tapered roller bearing and a cage.

The present application claims priority based on Japanese Patent Application No. 2020-169083 filed on Oct. 6, 2020, the entire contents of which are incorporated herein by reference.

BACKGROUND ART

Patent Literature 1 discloses a tapered roller bearing. The tapered roller bearing includes an inner ring, an outer ring, a plurality of tapered rollers, and an annular cage. The cage has a plurality of pockets for accommodating the tapered rollers, and retains the plurality of tapered rollers at intervals in the circumferential direction. In order to prevent the tapered rollers accommodated in the pockets from falling outward in the radial direction during assembly of the tapered roller bearing, each pocket has a retaining portion that can come into contact with the tapered roller from outside in the radial direction.

CITATION LIST

Patent Literature

PATENT LITERATURE 1: Japanese Laid-Open Patent Publication No. 2013-221592

SUMMARY OF THE INVENTION

Technical Problem

The tapered roller bearing is assembled as follows. As illustrated in FIG. 15A, tapered rollers 109 are accommodated in pockets 102 of a cage 101 to obtain a set 100 of a plurality of the tapered rollers 109 and the cage 101. The set 100 is brought close to an inner ring 108 in the axial direction and is combined with the inner ring 108. In the set 100, a diameter Di of the inscribed circle at small-diameter-side portions 109a of the plurality of tapered rollers 109 is smaller than an outer diameter Dc of a small flange portion 107 of the inner ring 108. For this reason, during an operation of combining the set 100 with the inner ring 108 (see FIG. 15B), the small-diameter-side portions 109a of the tapered rollers 109 need to climb over the small flange portion 107, so that they are displaced radially outward. However, the displacement is restricted by a retaining portion 103 of the pocket 102. Therefore, the operation of combining the set 100 with the inner ring 108 is not easy.

In view of this, the inner ring 108 is pressed against the cage 101 of the set 100 with a large force in the axial direction using a press or the like in order to allow the small-diameter-side portions 109a of the tapered rollers 109 to forcibly climb over the small flange portion 107. At this time, the tapered rollers 109 press the retaining portions 103, and the cage 101 is elastically deformed in the diameter increasing direction.

According to the above assembling method, an inner ring unit in which the inner ring 108, the cage 101, and the tapered rollers 109 are integrated is obtained. An outer ring is installed to the inner ring unit, and thus, the tapered roller bearing is completed.

When the small-diameter-side portions 109a of the tapered rollers 109 climb over the small flange portion 107, an excessive force is applied on the cage 101. Therefore, when the deformation of the cage 101 exceeds an allowable range, the cage 101 may be whitened or plastically deformed, or the cage 101 may be cracked.

In view of this, it is conceivable to reduce the size of the retaining portion 103 or reduce the protrusion height of the retaining portion 103. With this structure, an allowable amount of displacement of the tapered rollers 109 increases, and the operation of combining the set 100 with the inner ring 108 is facilitated. However, in this case, in the inner ring unit obtained by combining the set 100 with the inner ring 108 as described above, the tapered rollers 109 can be largely displaced, and at the same time, the cage 101 can also be largely displaced. As a result, it is highly likely that the tapered rollers 109 of the inner ring unit climb over the small flange portion 107 and fall out of the pockets 102, and the inner ring 108, the tapered rollers 109, and the cage 101 come apart.

As described above, when the operation of combining the set 100 with the inner ring 108 is facilitated by, for example, reducing the size of the retaining portion 103, the inner ring unit including the inner ring 108, the tapered rollers 109, and the cage 101 is likely to come apart. On the contrary, when, for example, the size of the retaining portion 103 is increased to prevent the inner ring unit from coming apart, it is difficult to combine the set 100 with the inner ring 108.

In view of this, an object of the present disclosure is to provide a tapered roller bearing and a cage that can achieve facilitating the operation of combining a set including a cage and a plurality of tapered rollers with an inner ring and preventing an inner ring unit obtained by combining the set with the inner ring from coming apart.

Solution to Problem

A tapered roller bearing according to the present disclosure includes: an inner ring that has an inner ring raceway provided on an outer peripheral side, a small flange portion provided on a first side of the inner ring raceway in an axial direction, and a large flange portion provided on a second side of the inner ring raceway in the axial direction; an outer ring that has an outer ring raceway on an inner peripheral side; a plurality of tapered rollers in rolling contact with the inner ring raceway and the outer ring raceway; and a cage that is annular and has a plurality of pockets for accommodating the tapered rollers, wherein the cage has a plurality of first lateral faces respectively facing outer peripheral surfaces of the tapered rollers respectively accommodated in the plurality of pockets from a first side in a circumferential direction of the cage and a plurality of second lateral faces respectively facing the outer peripheral surfaces of the tapered rollers from a second side in the circumferential direction of the cage, and the plurality of pockets includes a first pocket that has a first angle as an angle formed by one of the first lateral faces and one of the second lateral faces, and a second pocket that has a second angle smaller than the first angle as the angle formed by one of the first lateral faces and one of the second lateral faces.

A cage according to the present disclosure is a cage for a tapered roller bearing that includes an inner ring that has an inner ring raceway provided on an outer peripheral side, a small flange portion provided on a first side of the inner ring raceway in an axial direction, and a large flange portion provided on a second side of the inner ring raceway in the axial direction, an outer ring that has an outer ring raceway on an inner peripheral side, and a plurality of tapered rollers in rolling contact with the inner ring raceway and the outer ring raceway, the cage including: a plurality of pockets for accommodating the tapered rollers; a plurality of first lateral faces respectively facing outer peripheral surfaces of the tapered rollers respectively accommodated in the plurality of pockets from a first side in a circumferential direction of the cage; and a plurality of second lateral faces respectively facing the outer peripheral surfaces of the tapered rollers respectively accommodated in the plurality of pockets from a second side in the circumferential direction of the cage, wherein the plurality of pockets includes a first pocket that has a first angle as an angle formed by one of the first lateral faces and one of the second lateral faces, and a second pocket that has a second angle smaller than the first angle as the angle formed by one of the first lateral faces and one of the second lateral faces.

Advantageous Effects of the Invention

According to the present disclosure, it is possible to achieve facilitating an operation of combining a set including the cage and the plurality of tapered rollers with the inner ring and preventing an inner ring unit obtained by combining the set with the inner ring from coming apart.

DETAILED DESCRIPTION

Description of Embodiment of Present Disclosure

Figure 1A:
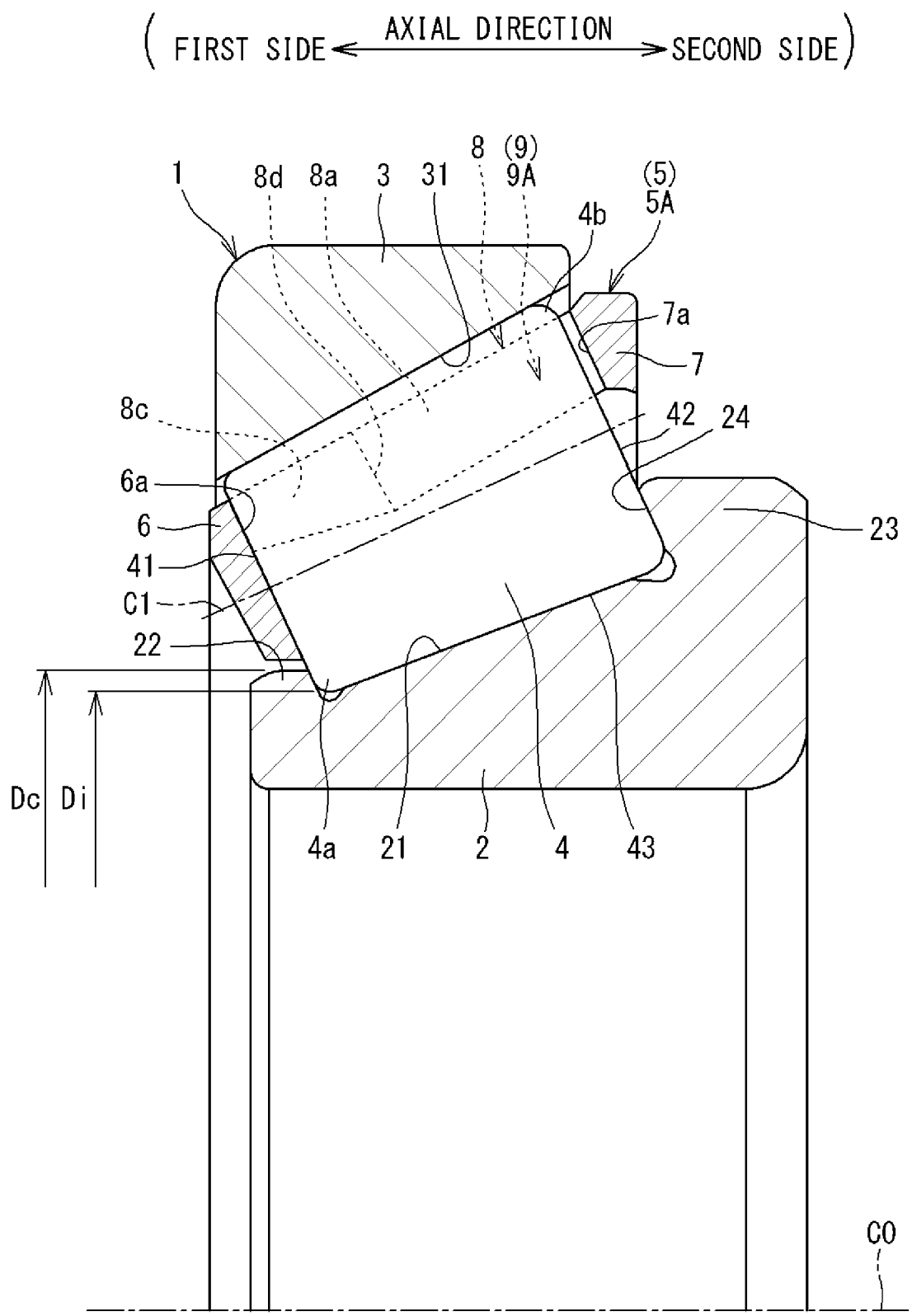
FIG. 1A is a cross-sectional view illustrating an example of a tapered roller bearing including a first pocket.
Figure 1B:
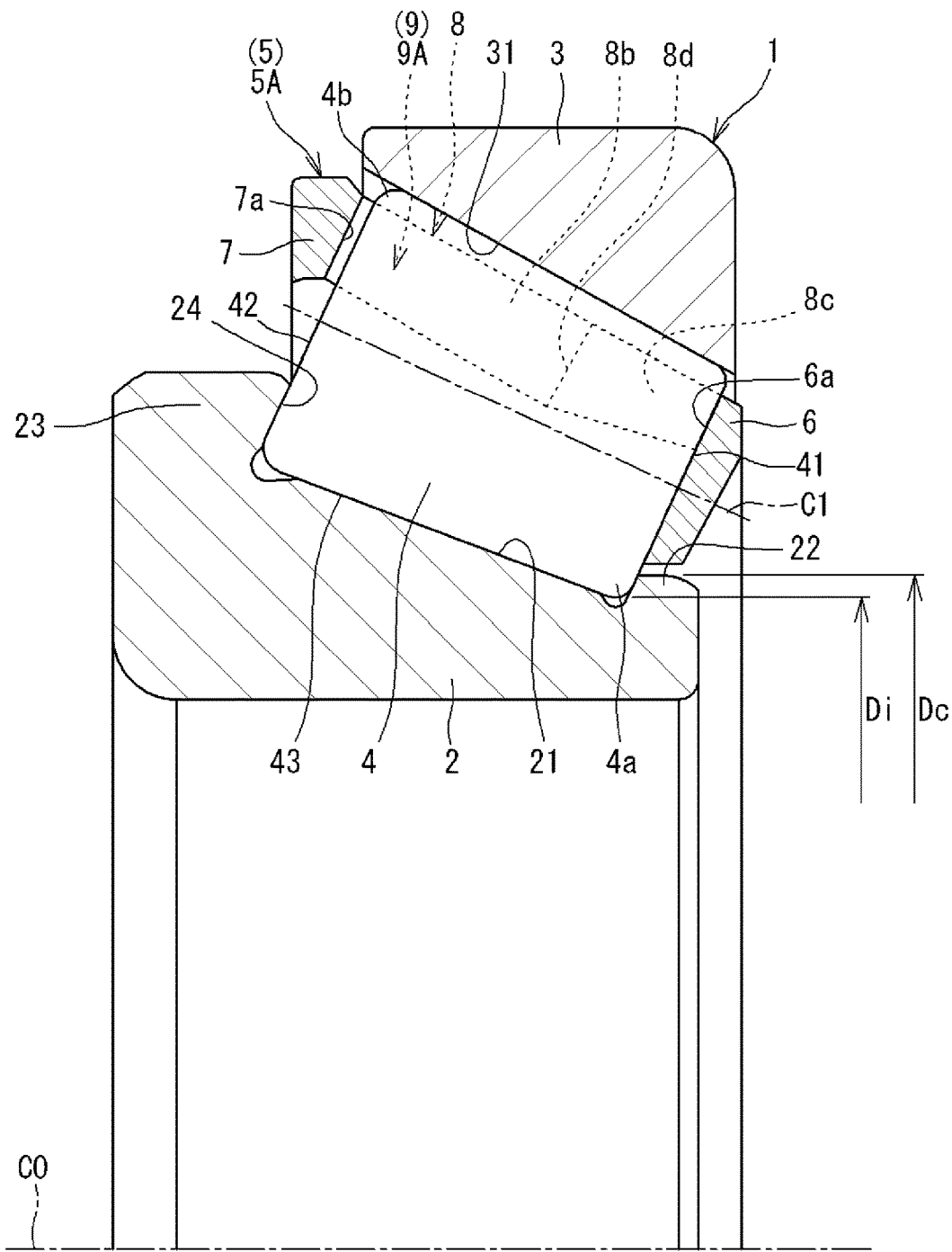
FIG. 1B is a cross-sectional view illustrating an example of the tapered roller bearing including the first pocket.
Figure 2A:
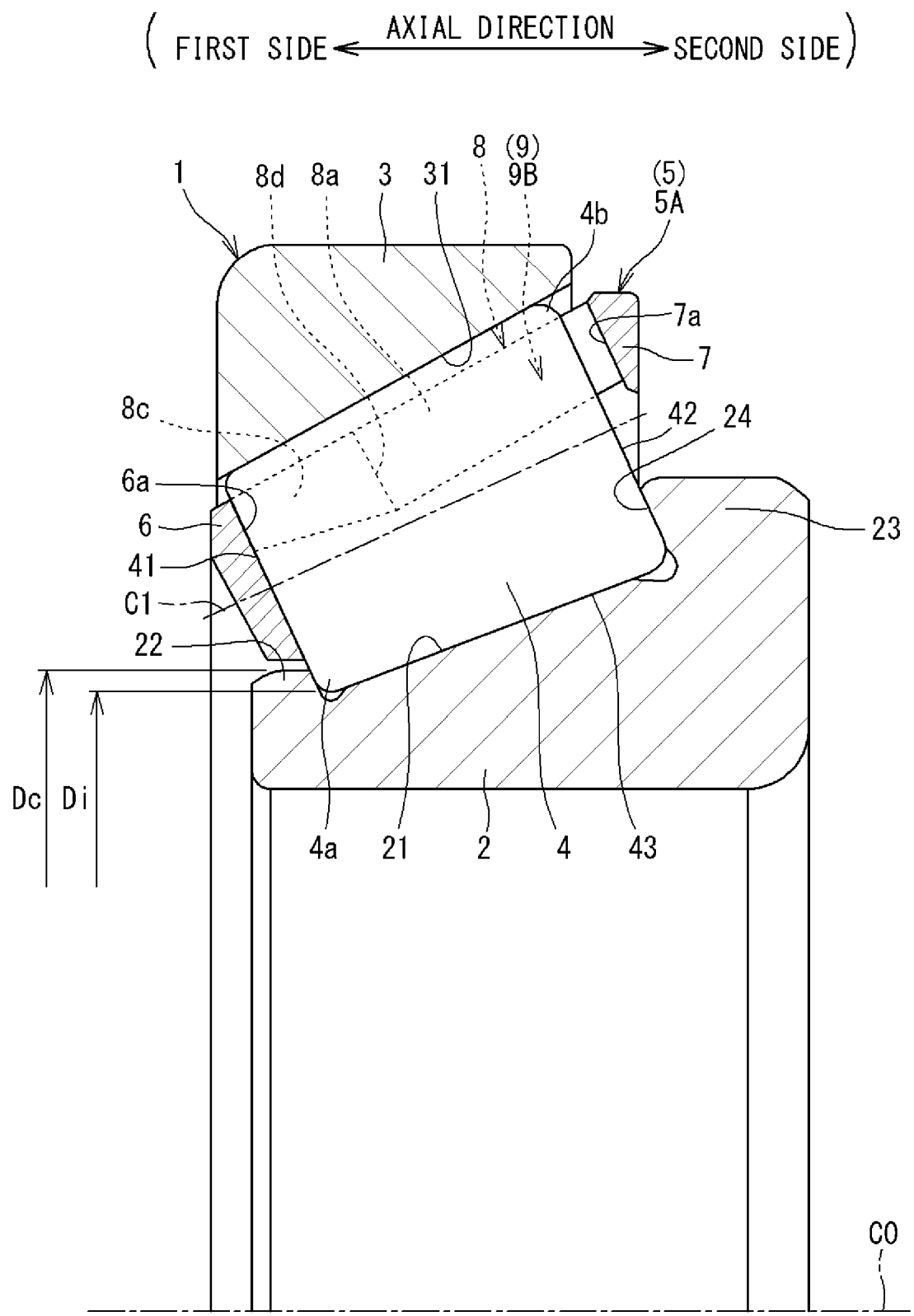
FIG. 2A is a cross-sectional view illustrating an example of the tapered roller bearing including a second pocket.
Figure 2B:
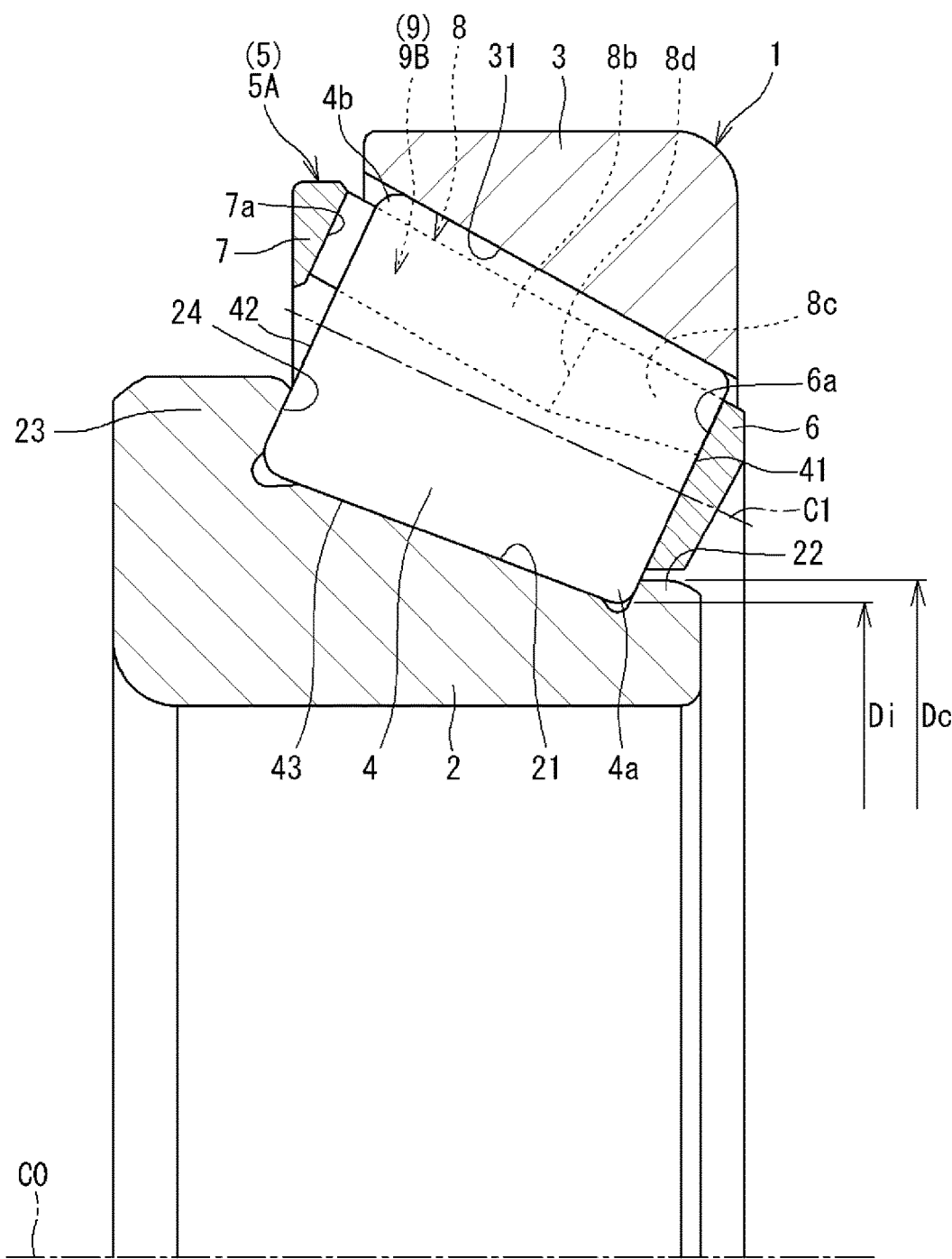
FIG. 2B is a cross-sectional view illustrating an example of the tapered roller bearing including the second pocket.

An embodiment of the present disclosure includes at least the following contents as a gist thereof.

(1) A tapered roller bearing according to the present disclosure includes: an inner ring that has an inner ring raceway provided on an outer peripheral side, a small flange portion provided on a first side of the inner ring raceway in an axial direction, and a large flange portion provided on a second side of the inner ring raceway in the axial direction; an outer ring that has an outer ring raceway on an inner peripheral side; a plurality of tapered rollers in rolling contact with the inner ring raceway and the outer ring raceway; and a cage that is annular and has a plurality of pockets for accommodating the tapered rollers, wherein the cage has a plurality of first lateral faces respectively facing outer peripheral surfaces of the tapered rollers respectively accommodated in the plurality of pockets from a first side in a circumferential direction of the cage and a plurality of second lateral faces respectively facing the outer peripheral surfaces of the tapered rollers from a second side in the circumferential direction of the cage, and the plurality of pockets includes a first pocket that has a first angle as an angle formed by one of the first lateral faces and one of the second lateral faces, and a second pocket that has a second angle smaller than the first angle as the angle formed by one of the first lateral faces and one of the second lateral faces.

According to the tapered roller bearing, it is possible to increase an allowable amount of displacement having a radial component of the tapered roller accommodated in the second pocket as compared with the tapered roller accommodated in the first pocket. Therefore, the tapered roller in the second pocket easily climbs over the small flange portion of the inner ring during an operation of combining a set including the cage and the plurality of tapered rollers with the inner ring. As a result, the operation of combining the set with the inner ring is facilitated as compared with a case where all the pockets are the first pockets.

In addition, it is possible to decrease an allowable amount of displacement having a radial component of the tapered roller accommodated in the first pocket as compared with the tapered roller accommodated in the second pocket. Therefore, when the set and the inner ring are combined to obtain an inner ring unit, the tapered roller in the first pocket is less likely to be displaced relative to the cage. Thus, as compared with a case where all the pockets are the second pockets, the tapered roller accommodated in each of the pockets is less likely to fall off from the inner ring unit, and the inner ring unit is less likely to come apart.

(2) In addition, the first lateral face and the second lateral face in the second pocket have, on the first side in the axial direction, a recessed portion that increases a gap between the tapered roller accommodated in the second pocket and the first and second lateral faces.

With this configuration in which the recessed portion is provided, when the tapered roller in the second pocket comes in contact with the small flange portion of the inner ring and the small-diameter-side portion of the tapered roller is displaced outward in the radial direction during the operation of combining the set with the inner ring, the displacement of the tapered roller is not interfered, whereby the allowable amount of displacement of the tapered roller in the second pocket including the displacement in the radial direction can be further increased. In addition, due to the formation of the recessed portion, it is possible to deform a column constituting the first lateral face and the second lateral face with a smaller force than in a case where there is no recessed portion, so that the operation of combining the set with the inner ring is further facilitated.

Further, with the configuration in which the recessed portion is formed on the first side in the axial direction of the first lateral face and the second lateral face, when the tapered roller in the second pocket is inclined, a position where the inclined tapered roller is brought into contact with the first lateral face and the second lateral face can be set to a position closer to the center side from the end of each lateral face. This makes it possible to deform the column with a smaller force, making it easier to combine the set with the inner ring.

(3) In addition, it is preferable that, in relation to a radial direction of the cage, the first lateral faces and the second lateral faces are provided to form a first gap with the tapered roller accommodated in the first pocket and are provided to form a second gap larger than the first gap with the tapered roller accommodated in the second pocket.

With this configuration, the allowable amount of displacement having the radial component of the tapered roller in the second pocket can be made larger than that of the tapered roller in the first pocket.

(4) In addition, it is preferable that the cage includes a plurality of small-diameter-side lateral faces respectively facing small-diameter-side end faces of the tapered rollers respectively accommodated in the plurality of pockets, and a plurality of large-diameter-side lateral faces respectively facing large-diameter-side end faces of the tapered rollers respectively accommodated in the plurality of pockets, and when a distance between the small-diameter-side lateral face and the large-diameter-side lateral face in the first pocket is defined as a first distance, a distance between the small-diameter-side lateral face and the large-diameter-side lateral face in the second pocket is a second distance larger than the first distance.

With this configuration, the allowable amount of displacement of the tapered roller accommodated in each pocket can be finely adjusted by further adjusting the first angle of the first pocket and the second angle of the second pocket.

(5) In addition, it is preferable that the cage includes a plurality of small-diameter-side lateral faces respectively facing small-diameter-side end faces of the tapered rollers respectively accommodated in the plurality of pockets, each of the small-diameter-side lateral faces has a small-diameter-side first lateral face located on an inner side of the cage in the radial direction and a small-diameter-side second lateral face located further to an outer side of the cage in the radial direction with respect to the small-diameter-side first lateral face, and when a distance between the small-diameter-side first lateral face and the small-diameter-side end face in the first pocket is defined as a third distance, a distance between the small-diameter-side first lateral face and the small-diameter-side end face in the second pocket is a fourth distance larger than the third distance, and a distance between the small-diameter-side second lateral face and the small-diameter-side end face in the second pocket is a fifth distance smaller than the fourth distance.

With this configuration, it is possible to increase an allowable amount of displacement of the tapered roller accommodated in the second pocket in a predetermined displacement direction necessary for assembly while suppressing displacement of the tapered roller in an unintended direction.

(6) In addition, it is preferable that the cage includes a plurality of large-diameter-side lateral faces respectively facing large-diameter-side end faces of the tapered rollers respectively accommodated in the plurality of pockets, each of the large-diameter-side lateral faces has a large-diameter-side first lateral face located on an outer side of the cage in the radial direction and a large-diameter-side second lateral face located further to an inner side of the cage in the radial direction with respect to the large-diameter-side first lateral face, and when a distance between the large-diameter-side first lateral face and the large-diameter-side end face in the first pocket is defined as a sixth distance, a distance between a radially outer end of the large-diameter-side first lateral face and the large-diameter-side end face in the second pocket is a seventh distance larger than the sixth distance, and a distance between the large-diameter-side second lateral face and the large-diameter-side end face in the second pocket is an eighth distance smaller than the seventh distance.

With this configuration, it is possible to increase an allowable amount of displacement of the tapered roller accommodated in the second pocket in a predetermined displacement direction necessary for assembly while suppressing displacement of the tapered roller in an unintended direction.

(7) In addition, it is preferable that a plurality of the second pockets is spaced from each other in the circumferential direction with the first pocket interposed between the second pockets.

With this configuration, it is possible to suppress a variation in the circumferential direction of a force acting on the cage during the operation of combining the set including the cage and the plurality of tapered rollers with the inner ring. Accordingly, intensive application of force on a part of the cage during the operation of combining the set with the inner ring can be prevented, and thus, damage of the cage can be suppressed.

(8) The present disclosure provides a cage for a tapered roller bearing that includes an inner ring that has an inner ring raceway provided on an outer peripheral side, a small flange portion provided on a first side of the inner ring raceway in an axial direction, and a large flange portion provided on a second side of the inner ring raceway in the axial direction, an outer ring that has an outer ring raceway on an inner peripheral side, and a plurality of tapered rollers in rolling contact with the inner ring raceway and the outer ring raceway, the cage including: a plurality of pockets for accommodating the tapered rollers; a plurality of first lateral faces respectively facing outer peripheral surfaces of the tapered rollers respectively accommodated in the plurality of pockets from a first side in a circumferential direction of the cage; and a plurality of second lateral faces respectively facing the outer peripheral surfaces of the tapered rollers respectively accommodated in the plurality of pockets from a second side in the circumferential direction of the cage, wherein the plurality of pockets includes a first pocket that has a first angle as an angle formed by one of the first lateral faces and one of the second lateral faces, and a second pocket that has a second angle smaller than the first angle as the angle formed by one of the first lateral faces and one of the second lateral faces.

According to the cage, it is possible to increase an allowable amount of displacement having a radial component of the tapered roller accommodated in the second pocket as compared with the tapered roller accommodated in the first pocket. Therefore, the tapered roller in the second pocket easily climbs over the small flange portion of the inner ring during an operation of combining a set including the cage and the plurality of tapered rollers with the inner ring. As a result, the operation of combining the set with the inner ring is facilitated as compared with a case where all the pockets are the first pockets.

In addition, it is possible to decrease an allowable amount of displacement having a radial component of the tapered roller accommodated in the first pocket as compared with the tapered roller accommodated in the second pocket. Therefore, when the set and the inner ring are combined to obtain an inner ring unit, the tapered roller in the first pocket is less likely to be displaced relative to the cage. Thus, as compared with a case where all the pockets are the second pockets, the tapered roller accommodated in each of the pockets is less likely to fall off from the inner ring unit, and the inner ring unit is less likely to come apart.

Details of Embodiments According to Present Disclosure

An embodiment of the present disclosure will be described below with reference to the drawings.

[Configuration of Tapered Roller Bearing]

Here, a configuration of a tapered roller bearing 1 according to the present disclosure will be described based on the tapered roller bearing 1 illustrated in FIGS. 1A, 1B, 2A, and 2B. The tapered roller bearing 1 illustrated in FIGS. 1A, 1B, 2A, and 2B includes a cage 5A which is a first mode of a cage 5. In the following description, when a configuration common to the cage 5A and cages 5 (later-described cages 5B to 5E) according to other modes to be described later is described, the cage 5A is simply referred to as "cage 5".

The tapered roller bearing 1 illustrated in FIGS. 1A, 1B, 2A, and 2B includes an inner ring 2, an outer ring 3 provided radially outward of the inner ring 2, a plurality of tapered rollers 4 provided between the inner ring 2 and the outer ring 3, and an annular cage 5 that holds the tapered rollers 4.

"Axial direction", "radial direction", and "circumferential direction" in the description of each of the inner ring 2, the outer ring 3, and the cage 5 will be defined. The "axial direction" refers to a direction along the centerline of each of the inner ring 2, the outer ring 3, and the cage 5. The axial direction also includes a direction parallel to the centerline. The "radial direction" is a direction orthogonal to the centerline of each of the inner ring 2, the outer ring 3, and the cage 5. The "circumferential direction" is a direction along a circle centered on the centerline of each of the inner ring 2, the outer ring 3, and the cage 5. In each drawing, the centerline is denoted by "C0" in a state where the centerlines of the inner ring 2, the outer ring 3, and the cage 5 coincide with each other.

"Axial direction", "radial direction", and "circumferential direction" in the description of the tapered roller 4 will be defined. The "axial direction" of the tapered roller 4 is a direction along the centerline C1 of the tapered roller 4. In order to distinguish the axial direction from the axial direction of the inner ring 2, the outer ring 3, and the cage 5, the axial direction of the cage 5 and the like may be simply referred to as an "axial direction", and the axial direction of the tapered roller 4 may be referred to as a "roller axial direction". The roller axial direction also includes a direction parallel to the centerline C1. The "radial direction" is a direction orthogonal to the centerline C1 of the tapered roller 4, and may be referred to as a "roller radial direction". The "circumferential direction" is a direction along a circle centered on the centerline C1 of the tapered roller 4, and can be referred to as a "roller circumferential direction".

The inner ring 2 is an annular member formed using bearing steel, mechanical structural steel, or the like. The inner ring 2 has a tapered inner ring raceway 21 on the outer peripheral side thereof. The inner ring 2 includes a small flange portion 22 provided on a first side (left side in FIGS. 1A and 2A, right side in FIGS. 1B and 2B) of the inner ring raceway 21 in the axial direction and a large flange portion 23 provided on a second side of the inner ring raceway 21 (right side in FIGS. 1A and 2A, left side in FIGS. 1B and 2B) in the axial direction. Each of the small flange portion 22 and the large flange portion 23 protrudes outward in the radial direction. In a state where the plurality of tapered rollers 4 is retained by the cage 5 and located between the inner ring 2 and the outer ring 3, the diameter Di of the inscribed circle at small-diameter-side portions 4a of the plurality of tapered rollers 4 is smaller than the outer diameter Dc of the small flange portion 22.

The outer ring 3 is an annular member formed using bearing steel, mechanical structural steel, or the like. The outer ring 3 has a tapered outer ring raceway 31 on the inner peripheral side thereof.

Each of the tapered rollers 4 is a tapered trapezoidal member formed using bearing steel or the like. Each of the tapered rollers 4 has a small-diameter-side end face 41 having a small diameter on a first side (left side in FIGS. 1A and 2A, right side in FIGS. 1B and 2B) in the roller axial direction and a large-diameter-side end face 42 having a large diameter on a second side (right side in FIGS. 1A and 2A, left side in FIGS. 1B and 2B) in the roller axial direction. The tapered rollers 4 are in rolling contact with the inner ring raceway 21 and the outer ring raceway 31. The large-diameter-side end faces 42 are in sliding contact with a lateral face (flange face) 24 of the large flange portion 23.

Figure 3:
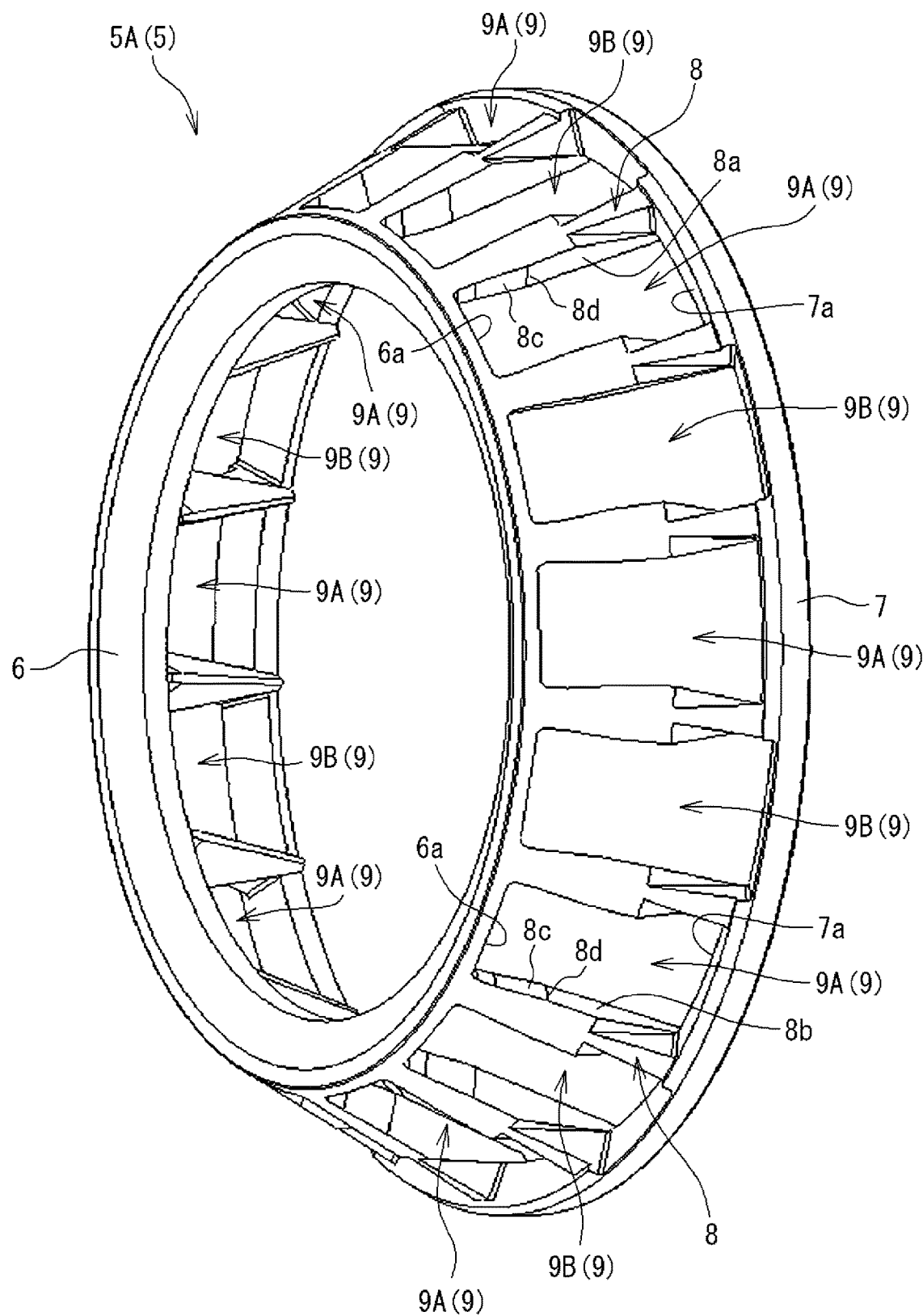
FIG. 3 is a perspective view illustrating a cage according to a first mode.

The cage 5 includes a small-diameter annular body 6 on the first side in the axial direction, a large-diameter annular body 7 on the second side in the axial direction, the large-diameter annular body 7 having an outer diameter larger than that of the small-diameter annular body 6, and a plurality of columns 8 provided at intervals in the circumferential direction (see FIG. 3). The small-diameter annular body 6 and the large-diameter annular body 7 have an annular shape and are provided apart from each other in the axial direction. The columns 8 connect the small-diameter annular body 6 and the large-diameter annular body 7. A space formed between the small-diameter annular body 6 and the large-diameter annular body 7 and between the two columns 8 and 8 adjacent to each other in the circumferential direction is a pocket 9. One tapered roller 4 is accommodated in each pocket 9.

The cage 5 has a plurality of pockets 9 for accommodating the tapered rollers 4, and holds the plurality of tapered rollers 4 at equal intervals in the circumferential direction. As will be described later, the cage 5 has two types of pockets 9 ("first pocket" and "second pocket") having different shapes.

The lateral faces of the two columns 8 and 8 face each other inside the pocket 9. A lateral face of one of the two columns 8 and 8 is a first lateral face 8a facing the outer peripheral surface 43 of the tapered roller 4 accommodated in the pocket 9 from the first side in the circumferential direction, and a lateral face of the other column 8 is a second lateral face 8b facing the outer peripheral surface 43 of the tapered roller 4 accommodated in the pocket 9 from the second side in the circumferential direction. The first lateral face 8a and the second lateral face 8b form a predetermined angle such that the distance between the lateral faces decreases toward the outside in the radial direction of the cage 5. The first lateral face 8a and the second lateral face 8b serve as retaining portions that prevent the tapered roller 4 accommodated in the pocket 9 from falling outside in the radial direction.

The small-diameter annular body 6 has small-diameter-side lateral faces 6a. Each of the small-diameter-side lateral faces 6a is a portion facing the small-diameter-side end face 41 of the tapered roller 4 accommodated in each of the pockets 9. As will be described later, when the tapered roller 4 accommodated in the pocket 9 is inclined, the small-diameter-side lateral face 6a has a function of restricting displacement of the small-diameter-side portion 4a of the tapered roller 4 toward the outside in the radial direction.

The large-diameter annular body 7 has large-diameter-side lateral faces 7a. Each of the large-diameter-side lateral faces 7a is a portion facing the large-diameter-side end face 42 of the tapered roller 4 accommodated in each of the pockets 9. As will be described later, when the tapered roller 4 accommodated in the pocket 9 is inclined, the large-diameter-side lateral face 7a has a function of restricting displacement of the large-diameter-side portion 4b of the tapered roller 4 toward the inside in the radial direction.

A space surrounded by the first lateral face 8a, the second lateral face 8b, the small-diameter-side lateral face 6a, and the large-diameter-side lateral face 7a is formed inside the pocket 9. The conical outer peripheral surface 43 of the tapered roller 4 accommodated in the pocket 9 faces the first lateral face 8a and the second lateral face 8b. In the tapered roller 4 accommodated in the pocket 9, the small-diameter-side end face 41 faces the small-diameter-side lateral face 6a, and the large-diameter-side end face 42 faces the large-diameter-side lateral face 7a.

The cage 5 is made of synthetic resin and is molded by injection molding. The cage 5 according to the present embodiment is made of, for example, polyphenylene sulfide resin (PPS). The cage 5 has resistance to lubricating oil (oil resistance), is relatively hard, and is hardly elastically deformed. The cage 5 may be manufactured by a 3D printer.

In the present disclosure, the cage 5 can be in sliding contact with a part of the inner peripheral surface of the outer ring 3, whereby the rotation of the cage 5 is guided by the outer ring 3. That is, the tapered roller bearing 1 illustrated in FIGS. 1 and 2 is an outer ring guided bearing in which the cage 5 is guided by the outer ring 3.

A state in which the centerline of the cage 5 coincides with the centerline of the inner ring 2 and the plurality of tapered rollers 4 held by the cage 5 appropriately contact the inner ring raceway 21 and the lateral face 24 of the large flange portion 23 as illustrated in FIGS. 1A, 1B, 2A, and 2B is defined as a "reference state". In a state in which the tapered rollers 4 are in contact with the outer ring raceway 31 in the reference state, the tapered rollers 4 are not displaceable in the roller radial direction and the roller axial direction. In the reference state, a gap is provided between the small-diameter-side end face 41 of the tapered roller 4 and the small-diameter annular body 6, and a gap is provided between the outer peripheral surface 43 of the tapered roller 4 and each of the lateral faces 8a and 8b of the columns 8. Therefore, the cage 5 can be slightly displaced in the radial direction and the axial direction with respect to the tapered rollers 4. In addition, the tapered rollers 4 can be slightly displaced in the axial direction and the radial direction from the reference state (see FIGS. 4A and 4B) in which the outer ring 3 is removed.

In the reference state, an imaginary circle connecting the centers of the small-diameter-side end faces 41 of the plurality of tapered rollers 4 is defined as a pitch circle on the small diameter side (in design) of the tapered rollers 4, and an imaginary circle connecting the centers of the large-diameter-side end faces 42 of the plurality of tapered rollers 4 is defined as a pitch circle on the large diameter side (in design) of the tapered rollers 4. An assembly (see FIG. 10A) in which the tapered rollers 4 are accommodated in the pockets 9 of the cage 5 is a "set 10" of the cage 5 and the tapered rollers 4. An assembly (see FIG. 11B) obtained by combining the set 10 and the inner ring 2 is an "inner ring unit 11".

In each of the set 10 and the inner ring unit 11, the plurality of tapered rollers 4 is arranged along the pitch circle on the small diameter side and the pitch circle on the large diameter side, unless otherwise specified. In the present disclosure, this state may be simply described as a state in which the tapered rollers 4 are disposed "along the pitch circle". Each of the tapered rollers 4 can be slightly displaced while being displaced radially outward from a state of being arranged along the pitch circle until coming into contact with each of the lateral faces 8a and 8b of the columns 8.

[Recessed Portion]

The tapered roller bearing 1 needs to cause deflection of the columns 8 during assembly. As illustrated in FIGS. 1A, 1B, 2A, and 2B, a recessed portion 8c is formed on each of the first lateral face 8a and the second lateral face 8b of the column 8 in the cage 5. The thickness of the recessed portion 8c of the column 8 in the circumferential direction is smaller than the thickness of a portion other than the recessed portion 8c of the column 8 in the circumferential direction. For this reason, a force required to generate certain deflection on the column 8 in the circumferential direction and in the radial direction is smaller than a force required to generate certain deflection on a column having no recessed portion 8c.

The recessed portion 8c is provided on the first side in the axial direction of the first lateral face 8a and the second lateral face 8b, and is adjacent to the small-diameter annular body 6. The recessed portion 8c forms a part of a space that receives the small-diameter-side portion 4a of the tapered roller 4 which is accommodated in the pocket 9 and which is inclined so as to be displaced outward in the radial direction of the cage 5. Due to having the recessed portion 8c, the cage 5 does not prevent the displacement of the tapered roller 4 when the small-diameter-side portion 4a of the tapered roller 4 is displaced radially outward due to the tapered roller 4 in the pocket 9 coming into contact with the small flange portion 22 of the inner ring 2 during the operation of combining the set 10 and the inner ring 2. Therefore, due to the formation of the recessed portion 8c, the pocket 9 provides a larger allowable amount of displacement of the small-diameter-side portion 4a to the outside in the radial direction of the cage 5, as compared to the case where the recessed portion 8c is not provided.

The column 8 has a ridgeline formed at a boundary between each of the first lateral face 8a and the second lateral face 8b and the recessed portion 8c. In this description, a portion where the ridgeline is formed is referred to as a boundary portion 8d. During assembly of the tapered roller bearing 1, the tapered roller 4 accommodated in the pocket 9 is inclined such that the small-diameter-side portion 4a thereof is displaced outward of the cage 5 in the radial direction. At this time, the tapered roller 4 comes into contact with the boundary portion 8d. The boundary portion 8d comes into contact with the tapered roller 4 and serves as a supporting point when the tapered roller 4 is inclined.

In the configuration in which the recessed portion 8c is formed on the first side in the axial direction of the first lateral face 8a and the second lateral face 8b, the boundary portion 8d can be located at a position closer to the center side from the end of each of the lateral faces 8a and 8b in the longitudinal direction of the column 8. As a result, when the tapered roller 4 accommodated in the pocket 9 is inclined and comes into contact with the boundary portion 8d between the first lateral face 8a and the second lateral face 8b, the tapered roller 4 presses the position near the center of the column 8 in the longitudinal direction.

[Small-Diameter-Side Lateral Face and Large-Diameter-Side Lateral Face]

When the tapered roller 4 is inclined at a predetermined inclination or more in a case where the tapered roller 4 accommodated in the pocket 9 is inclined such that the small-diameter-side portion 4a is displaced outward of the cage 5 in the radial direction with the boundary portion 8d as a supporting point, the small-diameter-side end face 41 comes into contact with the small-diameter-side lateral face 6a, and the large-diameter-side end face 42 comes into contact with the large-diameter-side lateral face 7a. The small-diameter-side lateral face 6a restricts displacement of the small-diameter-side portion 4a to the outside in the radial direction, and the large-diameter-side lateral face 7a restricts displacement of the large-diameter-side portion 4b to the inside in the radial direction.

As described above, in the cage 5, the allowable amount of displacement of the small-diameter-side portion 4a of the tapered roller 4 accommodated in the pocket 9 to the outside of the cage 5 in the radial direction is increased by the recessed portion 8c, and the displacement can be restricted by the small-diameter-side lateral face 6a and the large-diameter-side lateral face 7a.

[First Mode of Cage]

A cage 5A according to the first mode will now be described. In the following description, a "first pocket" in the cage 5A is referred to as a first pocket 9A, and a "second pocket" in the cage 5A is referred to as a second pocket 9B to be distinguished from "first pockets" and "second pockets" in the cages 5 according to the other modes.

As illustrated in FIG. 3, the cage 5A includes the first pocket 9A and the second pocket 9B which are two types of pockets 9 having different shapes.

Figure 4A:
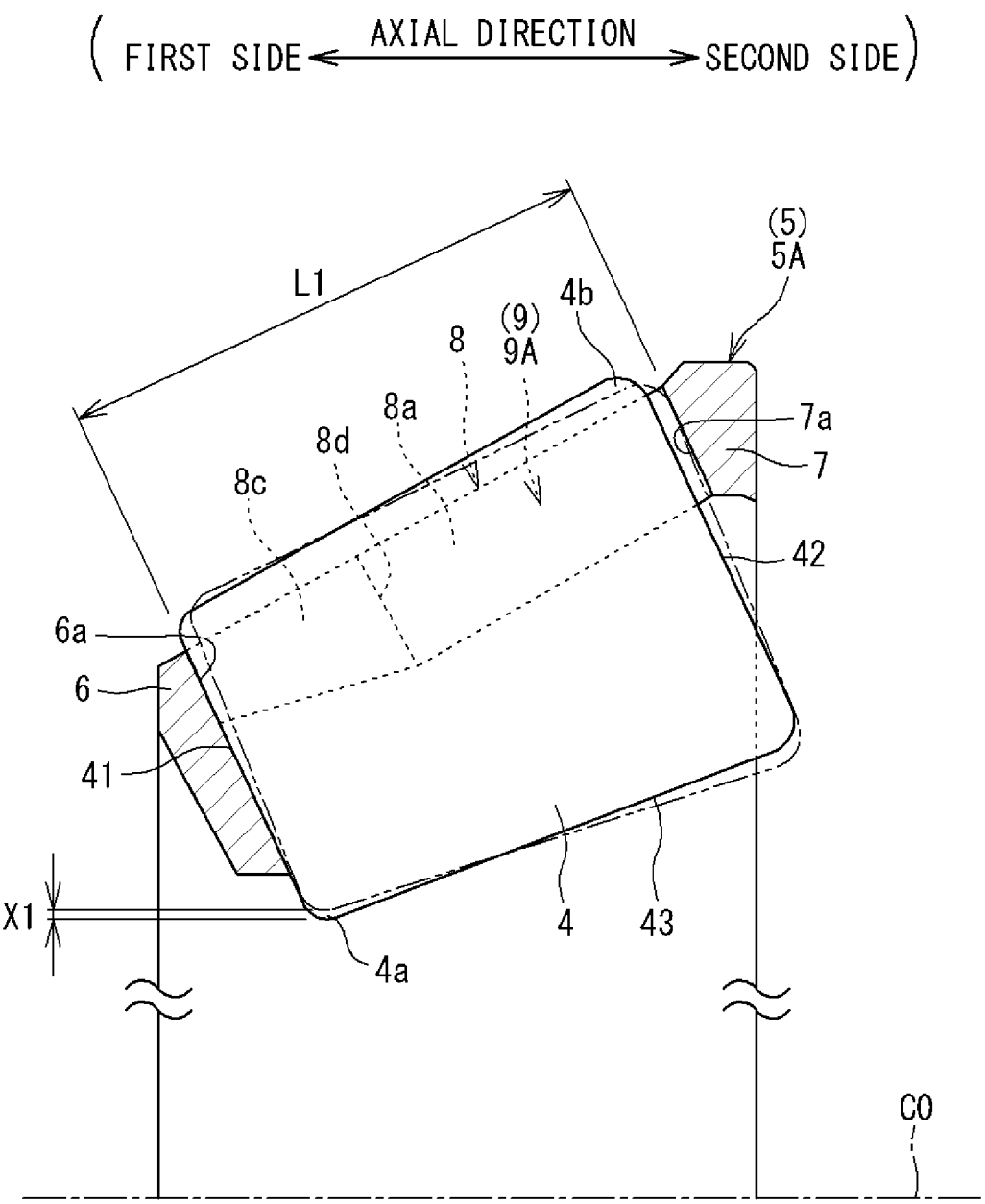
FIG. 4A is a cross-sectional view taken along a centerline of the cage including the first pocket according to the first mode.
Figure 4B:
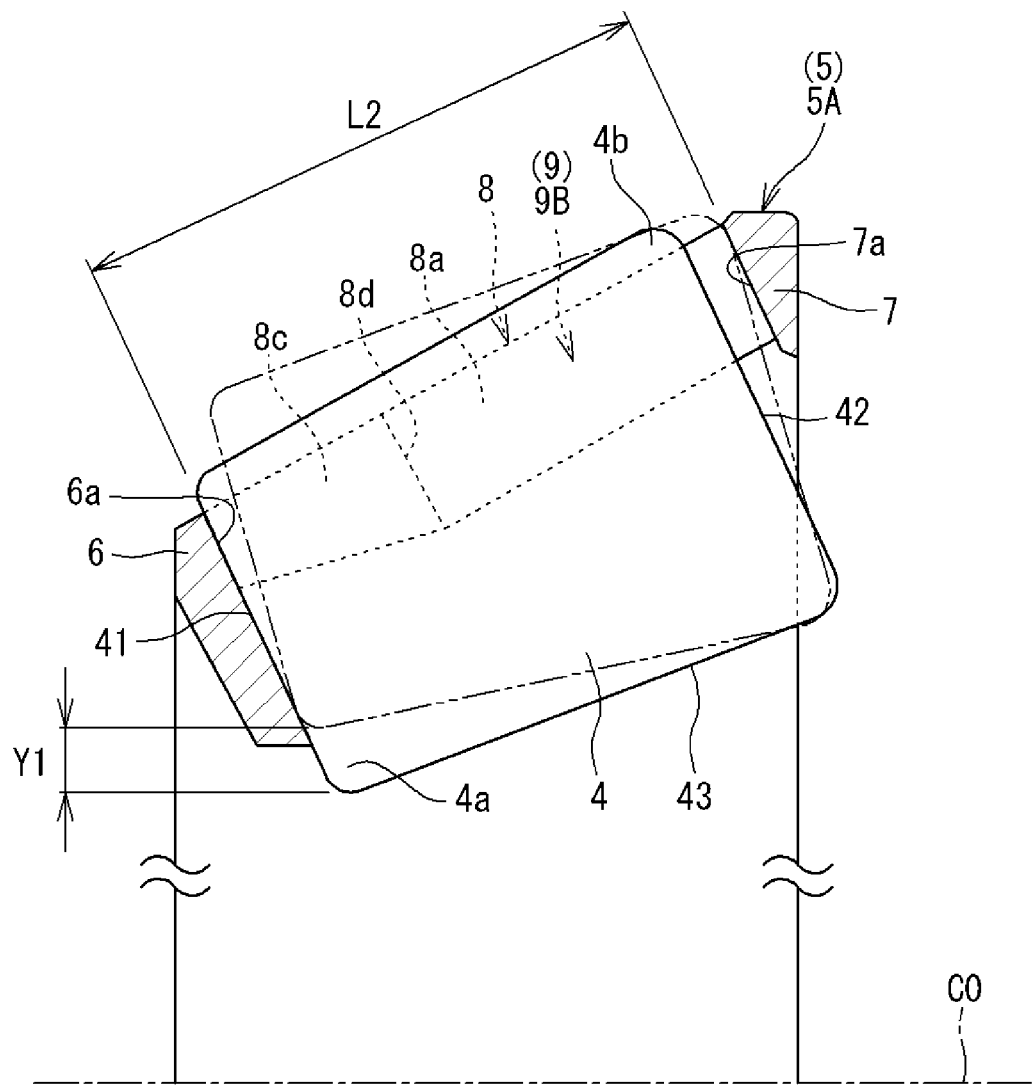
FIG. 4B is a cross-sectional view taken along a centerline of the cage including the second pocket according to the first mode.

FIGS. 4A and 4B are diagrams partially illustrating a cross section of the cage 5 including a centerline. FIG. 4A is a diagram illustrating a cross section including the first pocket 9A, and FIG. 4B is a diagram illustrating a cross section including the second pocket 9B. As illustrated in FIGS. 4A and 4B, the first pocket 9A has a first distance L1 as a distance from the small-diameter-side lateral face 6a to the large-diameter-side lateral face 7a, and the second pocket 9B has a second distance L2 as a distance from the small-diameter-side lateral face 6a to the large-diameter-side lateral face 7a. In the cage 5A, the second distance L2 is larger than the first distance L1 (L2>L1). Therefore, in the cage 5A, in a state where the dimension of the gap between the small-diameter-side lateral face 6a and the small-diameter-side end face 41 is the same between the first pocket 9A and the second pocket 9B, the tapered roller 4 accommodated in the second pocket 9B has a larger gap between the large-diameter-side end face 42 and the large-diameter-side lateral face 7a than the tapered roller 4 accommodated in the first pocket 9A.

Since there is the gap between the large-diameter-side end face 42 and the large-diameter-side lateral face 7a, the large-diameter-side portions 4b of the tapered rollers 4 accommodated in the pockets 9A and 9B are allowed to be displaced (inclined) in the axial direction or the radial direction while being displaced to the inside of the cage 5 in the radial direction. When the tapered rollers 4 are inclined in this manner, the displacement of the large-diameter-side portions 4b to the inside in the radial direction increases with an increase in the displacement of the large-diameter-side portions 4b in the axial direction.

The tapered roller 4 accommodated in the second pocket 9B has a larger gap between the large-diameter-side end face 42 and the large-diameter-side lateral face 7a than the tapered roller 4 accommodated in the first pocket 9A because of the relationship of L2>L1. For this reason, in the second pocket 9B, the allowable amount of displacement of the large-diameter-side portion 4b to the inside in the radial direction accompanying the displacement in the axial direction is larger than that in the first pocket 9A.

When the tapered roller 4 accommodated in each of the pockets 9A and 9B is inclined such that the large-diameter-side portion 4b is displaced radially inward, the small-diameter-side portion 4a located on the opposite side in the axial direction is displaced radially outward while being displaced in the axial direction accordingly. When the displacement of the large-diameter-side portion 4b to the inside in the radial direction increases, the displacement of the small-diameter-side portion 4a to the outside in the radial direction also increases. Therefore, the tapered roller 4 accommodated in the second pocket 9B has a larger allowable amount of displacement of the small-diameter-side portion 4a to the outside in the radial direction than the tapered roller 4 accommodated in the first pocket 9A.

Here, the allowable amount of displacement of the small-diameter-side portion 4a of the tapered roller 4 accommodated in the first pocket 9A to the outside in the radial direction is defined as a "first displacement amount X1" (see FIG. 4A), and the allowable amount of displacement of the small-diameter-side portion 4a of the tapered roller 4 accommodated in the second pocket 9B to the outside in the radial direction is defined as a "second displacement amount Y1" (see FIG. 4B). The "first displacement amount X1" and the "second displacement amount Y1" can also be said to be a displaceable amount of the tapered roller 4, which is positioned along the pitch circle, to the outside in the radial direction.

In the cage 5A according to the present disclosure, the second distance L2 is larger than the first distance L1 (L2>L1). Therefore, the "second displacement amount Y1"

is larger than the "first displacement amount X" (Y1>X1). Thus, the tapered roller 4 accommodated in the second pocket 9B of the cage 5A has a larger diameter Di of the inscribed circle at the small-diameter-side portion 4a than the tapered roller 4 accommodated in the first pocket 9A of the cage 5A.

In the cage 5A described in the above description, the relationship of L2>L1 is obtained by recessing the large-diameter annular body 7 in the second pocket 9B to form the large-diameter-side lateral face 7a. However, the relationship of L2>L1 is obtained by recessing the small-diameter annular body 6 in the second pocket 9B to form the small-diameter-side lateral face 6a.

In the cage 5A, the supporting point (contact point with the boundary portion 4d) of the tapered roller 4 when the tapered roller 4 accommodated in the second pocket 9B is inclined such that the small-diameter-side portion 4a is displaced radially outward is located closer to the small-diameter-side end face 41. In this case, the distance from the supporting point to the large-diameter-side portion 4b is larger than the distance from the supporting point to the small-diameter-side portion 4a, and thus, the displacement of a radially outer part of the large-diameter-side portion 4b to the second side in the axial direction during inclination of the tapered roller 4 is larger than the displacement of a radially inner part of the small-diameter-side portion 4a to the first side in the axial direction. Therefore, the inclination of the tapered roller 4 can be increased more by increasing the gap on the side of the large-diameter-side portion 4b rather than by increasing the gap on the side of the small-diameter-side portion 4a. Thus, in order to further increase the "second displacement amount Y1" of the second pocket 9B, it is preferable to obtain the relationship of L2>L1 by recessing the large-diameter annular body 7 in the second pocket 9B to form the large-diameter-side lateral face 7a rather than by recessing the small-diameter annular body 6 in the second pocket 9B to form the small-diameter-side lateral face 6a.

[Second Mode of Cage]

A cage 5B according to the second mode will now be described. In the following description, a "first pocket" in the cage 5B is referred to as a first pocket 9C, and a "second pocket" in the cage 5B is referred to as a second pocket 9D to be distinguished from the "first pockets" and the "second pockets" in the cages 5 according to the other modes.

Figure 5:
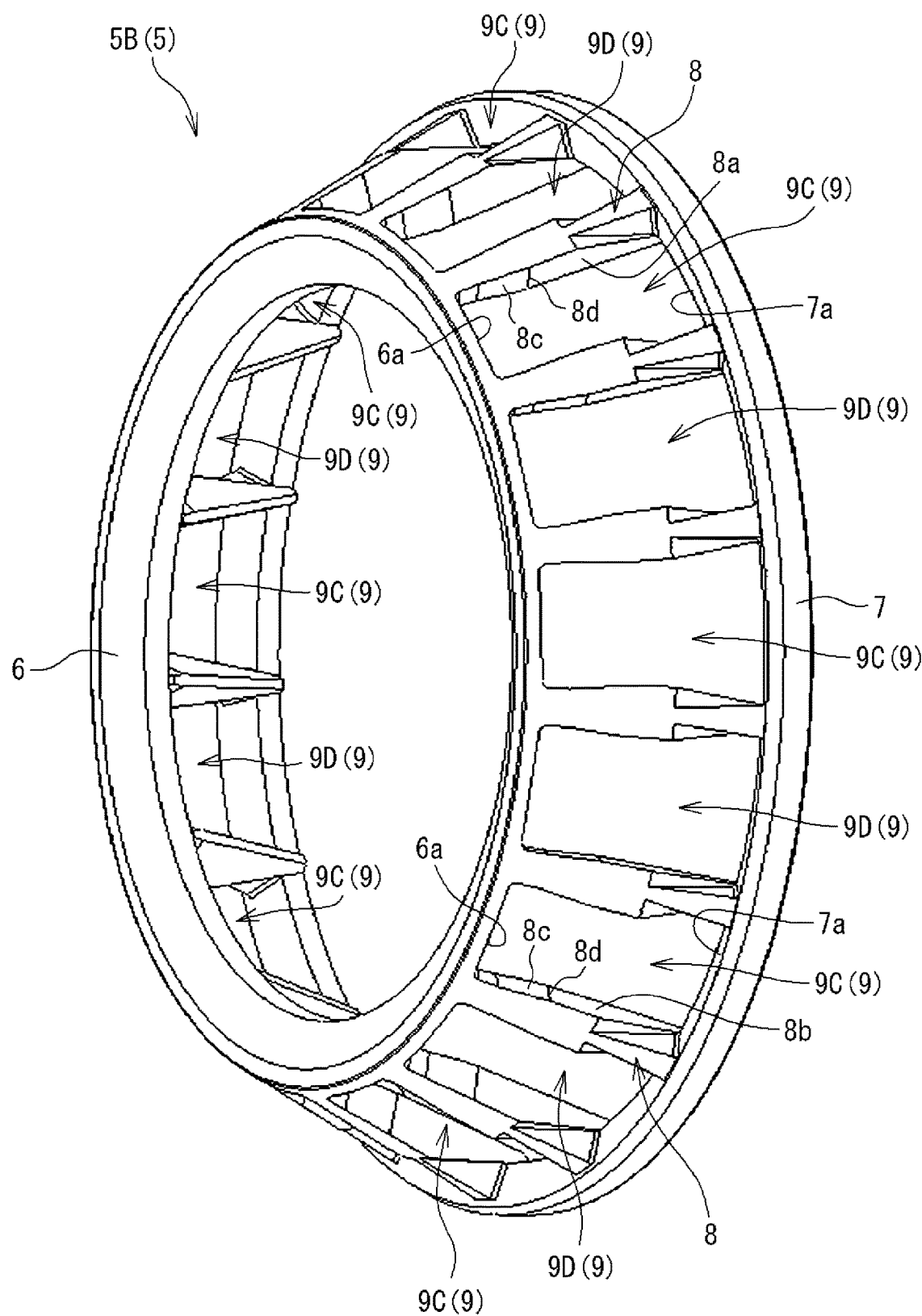
FIG. 5 is a perspective view illustrating a cage according to a second mode.

As illustrated in FIG. 5, the cage 5B includes the first pocket 9C and the second pocket 9D which are two types of pockets 9 having different shapes.

Figure 6A:
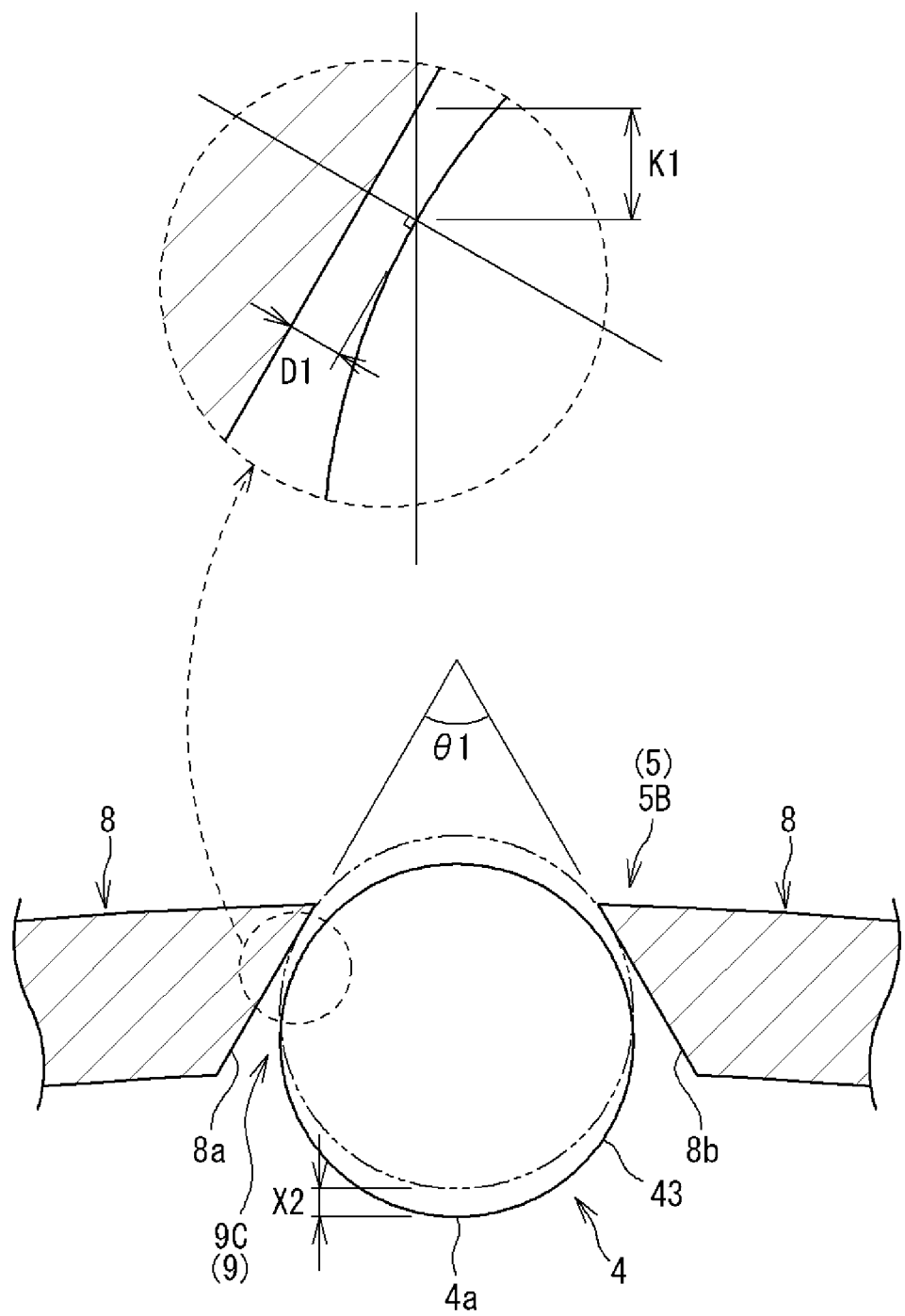
FIG. 6A is an explanatory diagram of a first pocket as viewed along a roller axial direction.
Figure 6B:
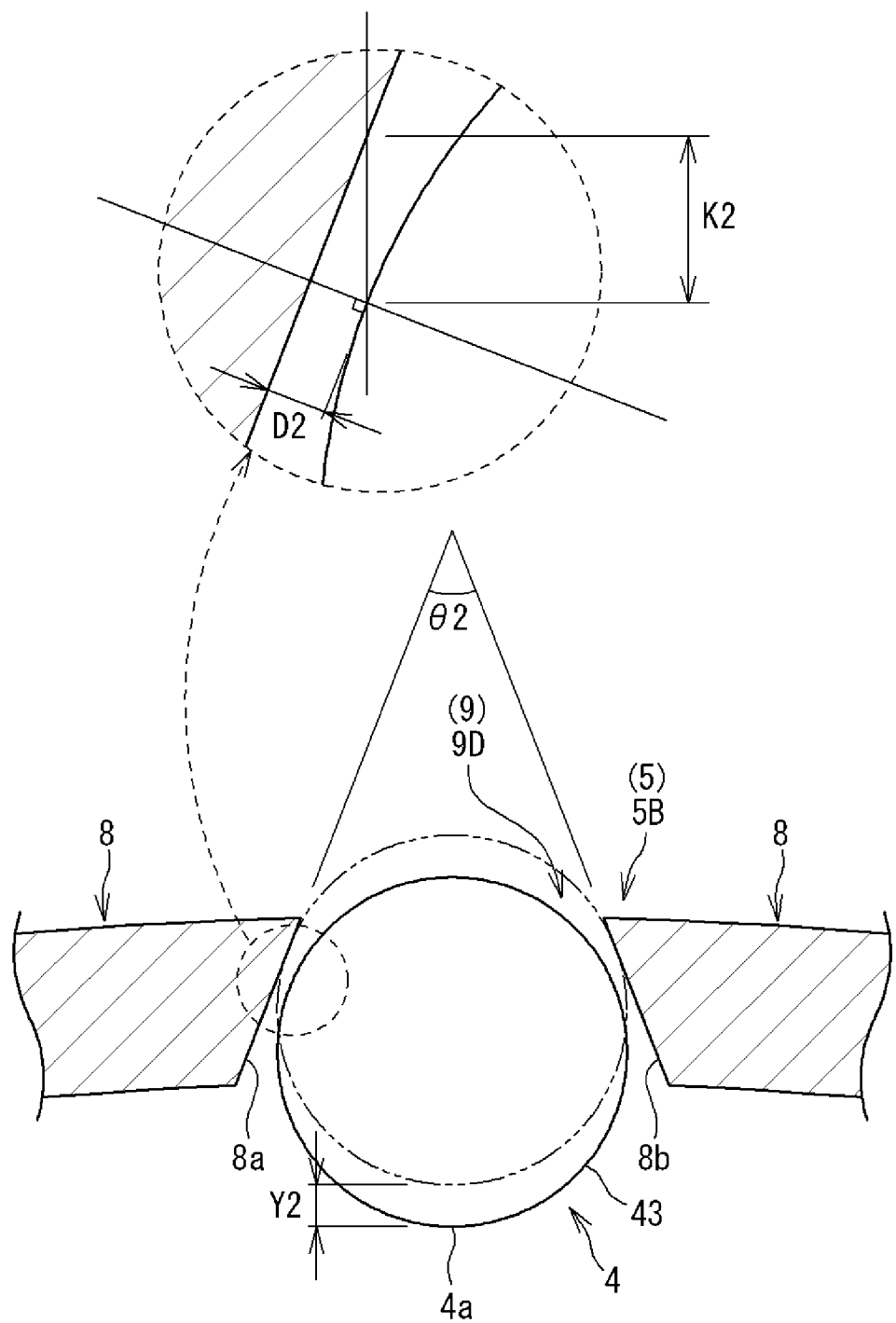
FIG. 6B is an explanatory diagram of a second pocket as viewed along a roller axial direction.

As illustrated in FIG. 6, in the cage 5B, the first pocket 9C has a first angle θ1 as the angle formed by the first lateral face 8a and the second lateral face 8b, and the second pocket 9D has a second angle θ2 as the angle formed by the first lateral face 8a and the second lateral face 8b. In the cage 5B, the second angle θ2 is smaller than the first angle θ1 (θ2<θ1). Each of the angles θ1 and θ2 is an angle formed by a line passing through the upper end and the lower end of the first lateral face 8a and a line passing through the upper end and the lower end of the second lateral face 8b in the cross section of the cage 5B taken along a plane perpendicular to the roller axial direction (see FIGS. 6A and 6B). Further, the angles 81 and θ2 are constant along the roller axial direction on the first lateral face 8a and the second lateral face 8b excluding the recessed portion 8c.

As illustrated in FIG. 6A, in the first pocket 9C, a gap D1 is provided between the tapered roller 4 located along the pitch circle and each of the first lateral face 8a and the second lateral face 8b in relation to the radial direction of the tapered roller 4. In the first pocket 9C, a first gap K1 is provided between the tapered roller 4 located along the pitch circle and each of the first lateral face 8a and the second lateral face 8b in relation to the radial direction of the cage 5B. The first gap K1 is a gap at a position where the first lateral face 8a and the second lateral face 8b can come into contact with the tapered roller 4. Due to the first gap K1, the tapered roller 4 in the first pocket 9C is allowed to have displacement having a radial component. Here, an allowable amount of the displacement is defined as "first displacement amount X2". The "first displacement amount X2" can also be said to be a displaceable amount of the tapered roller 4, which is positioned along the pitch circle, to the outside in the radial direction.

As illustrated in FIG. 6B, in the second pocket 9D, a gap D2 is provided between the tapered roller 4 located along the pitch circle and each of the first lateral face 8a and the second lateral face 8b in relation to the radial direction of the tapered roller 4. In the second pocket 9D, a second gap K2 is provided between the tapered roller 4 located along the pitch circle and each of the first lateral face 8a and the second lateral face 8b in relation to the radial direction of the cage 5B. The second gap K2 is a gap at a position where the first lateral face 8a and the second lateral face 8b can come into contact with the tapered roller 4. Due to the second gap K2, the tapered roller 4 in the second pocket 9D is allowed to have displacement having a radial component. Here, an allowable amount of the displacement is defined as "second displacement amount Y2". The "second displacement amount Y2" can also be said to be a displaceable amount of the tapered roller 4, which is positioned along the pitch circle, to the outside in the radial direction. The gap D1 in the first pocket 9C is substantially equal to the gap D2 in the second pocket 9D.

In the cage 5B according to the present disclosure, the second angle θ2 is smaller than the first angle θ1 (θ2<θ1). Therefore, the second gap K2 is larger than the first gap K1 (K2>K1), and thus, the "second displacement amount Y2" is larger than the "first displacement amount X2" (Y2>X2). Therefore, the tapered roller 4 accommodated in the second pocket 9D of the cage 5B has a larger diameter Di of the inscribed circle at the small-diameter-side portion 4a than the tapered roller 4 accommodated in the first pocket 9C of the cage 5B.

[Third Mode of Cage]

A cage 5C according to the third mode will now be described. In the following description, a "first pocket" in the cage 5C is referred to as a first pocket 9E, and a "second pocket" in the cage 5C is referred to as a second pocket 9F to be distinguished from the "first pockets" and the "second pockets" in the cages 5 according to the other modes. In the following description, portions of the cage 5C common to those of the cages 5A and 5B are denoted by the reference numerals used in the description of the cages 5A and 5B, and the description thereof will be omitted unless otherwise specified.

Figure 7:
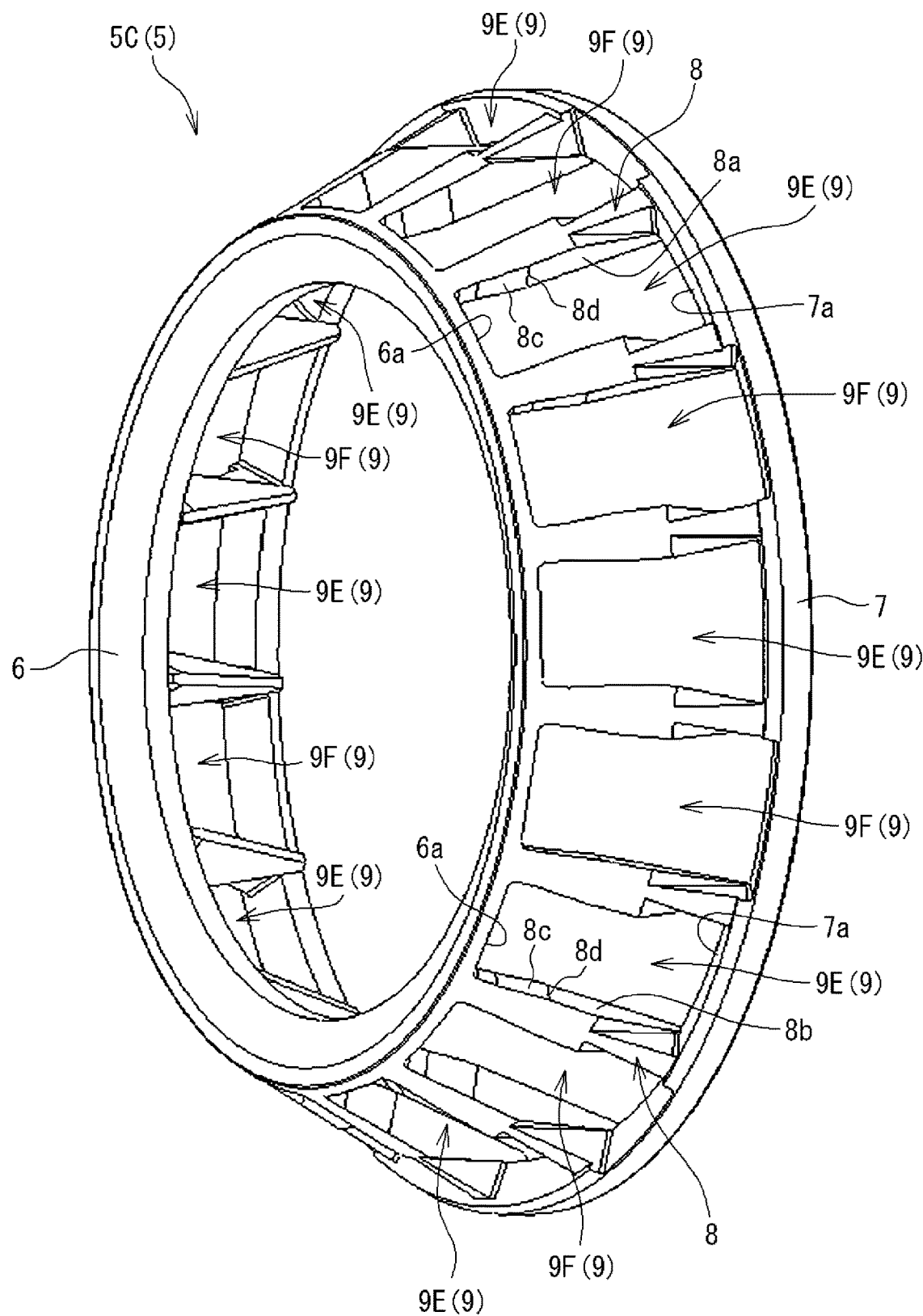
FIG. 7 is a perspective view illustrating a cage according to a third mode.

As illustrated in FIG. 7, the cage 5C includes the first pocket 9E and the second pocket 9F which are two types of pockets 9 having different shapes.

Although not illustrated in FIG. 7, the cage 5C includes:
- a configuration common to the cage 5A in which the second distance L2 is larger than the first distance L1; and
- a configuration common to the cage 5B in which the second angle θ2 is smaller than the first angle θ1 and the second gap K2 is larger than the first gap KL.

The first pocket 9E has the first distance L1 (see FIG. 4A) as the distance from the small-diameter-side lateral face 6a to the large-diameter-side lateral face 7a, and has the first angle θ1 (see FIG. 6A) as the angle formed by the first lateral face 8a and the second lateral face 8b. The second pocket 9F has the second distance L2 (see FIG. 4B) as the distance from the small-diameter-side lateral face 6a to the large-diameter-side lateral face 7a, and has the second angle θ2 (see FIG. 6B) as the angle formed by the first lateral face 8a and the second lateral face 8b. In the cage 5C, the second distance L2 is larger than the first distance L1. In the cage 5C, the second angle θ2 is smaller than the first angle θ1, and the second gap K2 is larger than the first gap KL.

In the cage 5C according to the present disclosure, the second distance L2 is larger than the first distance L1 (L2>L1), and the second gap K2 is larger than the first gap K1 (K2>K1). Therefore, in the cage 5C, the "second displacement amount" is larger than the "first displacement amount" as in the cage 5A and the cage 5B. Thus, the tapered roller 4 accommodated in the second pocket 9F of the cage 5C has a larger diameter Di of the inscribed circle at the small-diameter-side portion 4a than the tapered roller 4 accommodated in the first pocket 9E of the cage 5C.

In the cage 5C according to the present disclosure, the relationship between the first distance L1 and the second distance L2 and the relationship between the first angle θ1 and the second angle θ2 can be adjusted, so that the "first displacement amount" and the "second displacement amount" can finely be adjusted. In the cage 5C according to the present disclosure, each of the pockets 9E and 9F has both the configuration in which the second distance L2 is larger than the first distance L1 and the configuration in which the second angle θ2 is smaller than the first angle θ1 and the second gap K2 is larger than the first gap K1. However, the pockets 9E and 9F each having only one of the above configurations may be uniformly distributed.

As described above, the pockets 9 including the "first pocket" and the "second pocket" in each of the cages 5A, 5B, and 5C according to the present disclosure vary in allowable amounts of displacement of the tapered rollers 4 accommodated therein in the radial direction. Specifically, each of the cages 5A, 5B, and 5C has the "first pocket" having the "first displacement amount" as the allowable amount of displacement and the "second pocket" having, as the allowable amount of displacement, the "second displacement amount" larger than the "first displacement amount".

[Displacement of Tapered Roller 4]

Figure 8A:
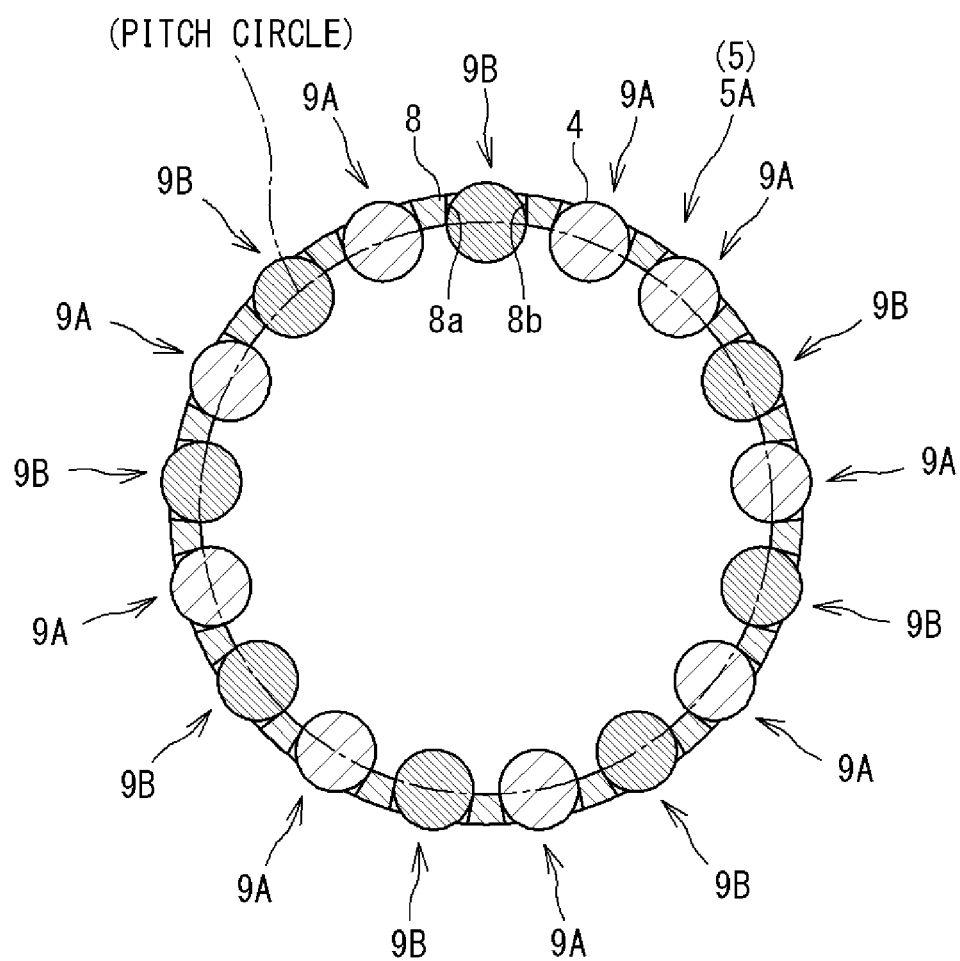
FIG. 8A is an image diagram of the cage and tapered rollers when viewed from a first side in the axial direction.
Figure 8B:
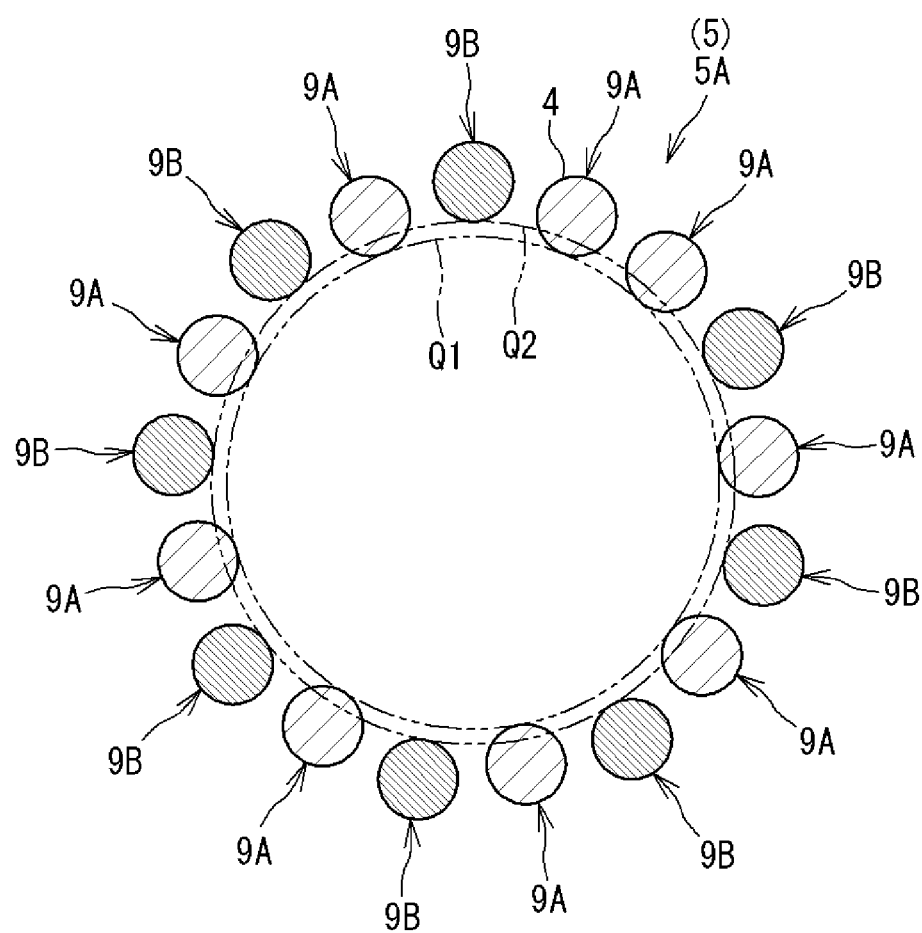
FIG. 8B is an image diagram of a state in which the tapered rollers are displaced when viewed from the first side in the axial direction.

FIG. 8A illustrates a state in which the plurality of tapered rollers 4 is arranged along the pitch circle as described above. On the other hand, FIG. 8B illustrates a state in which the plurality of tapered rollers 4 is not arranged along the pitch circle, and each of the tapered rollers 4 is displaced for the "first displacement amount" or the "second displacement amount". That is, FIG. 8B illustrates a state in which each of the tapered rollers 4 is in contact with the first lateral face 8a and the second lateral face 8b. FIG. 8B does not illustrate the cage 5A. The tapered roller 4 in the first pocket 9A and the tapered roller 4 in the second pocket 9B are hatched, and they are distinguished from each other by changing the hatch density. In FIG. 8B, an inscribed circle at the small-diameter-side portions 4a of the tapered rollers 4 accommodated in the first pockets 9A and in contact with the first lateral faces 8a and the second lateral faces 8b is defined as Q1. An inscribed circle at the small-diameter-side portions 4a of the tapered rollers 4 accommodated in the second pockets 9B and in contact with the first lateral faces 8a and the second lateral faces 8b is defined as Q2.

As described above, in the cage 5A, the "first displacement amount" and the "second displacement amount" are different, and thus, the diameter of the first inscribed circle Q1 and the diameter of the second inscribed circle Q2 are different (the diameter of the inscribed circle Q2>the diameter of the inscribed circle Q1). In FIGS. 1 and 2, the outer diameter (maximum outer diameter) Dc of the small flange portion 22 of the inner ring 2 may be equal to or smaller than the diameter of the second inscribed circle Q2 and equal to or larger than the diameter of the first inscribed circle Q1. However, in the present disclosure, the outer diameter (maximum outer diameter) Dc is equal to or larger than the diameter of the first inscribed circle Q1 and equal to or larger than the diameter of the second inscribed circle Q2. Although the tapered rollers 4 accommodated in the first pocket 9A and the second pocket 9B of the cage 5A have been described here as an example, the displacement of the tapered rollers 4 accommodated in the first pocket 9C and the second pocket 9D of the cage 5B and the displacement of the tapered rollers 4 accommodated in the first pocket 9E and the second pocket 9F of the cage 5C can be similarly described.

[Arrangement of Pockets in Circumferential Direction]

In FIG. 8A, the tapered roller 4 in the first pocket 9A and the tapered roller 4 in the second pocket 9B are hatched, and they are distinguished from each other by changing the hatch density. The cage 5A illustrated in FIG. 8A has a total of 17 pockets 9. Eight pockets in the 17 pockets are the second pockets 9B and the remaining nine pockets are the first pockets 9A. The second pockets 9B are spaced from each other in the circumferential direction of the cage 5A with one or more first pockets 9A therebetween. The pockets 9A and 9B in the cage 5A may be disposed as illustrated in FIG. 9.

Figure 9:
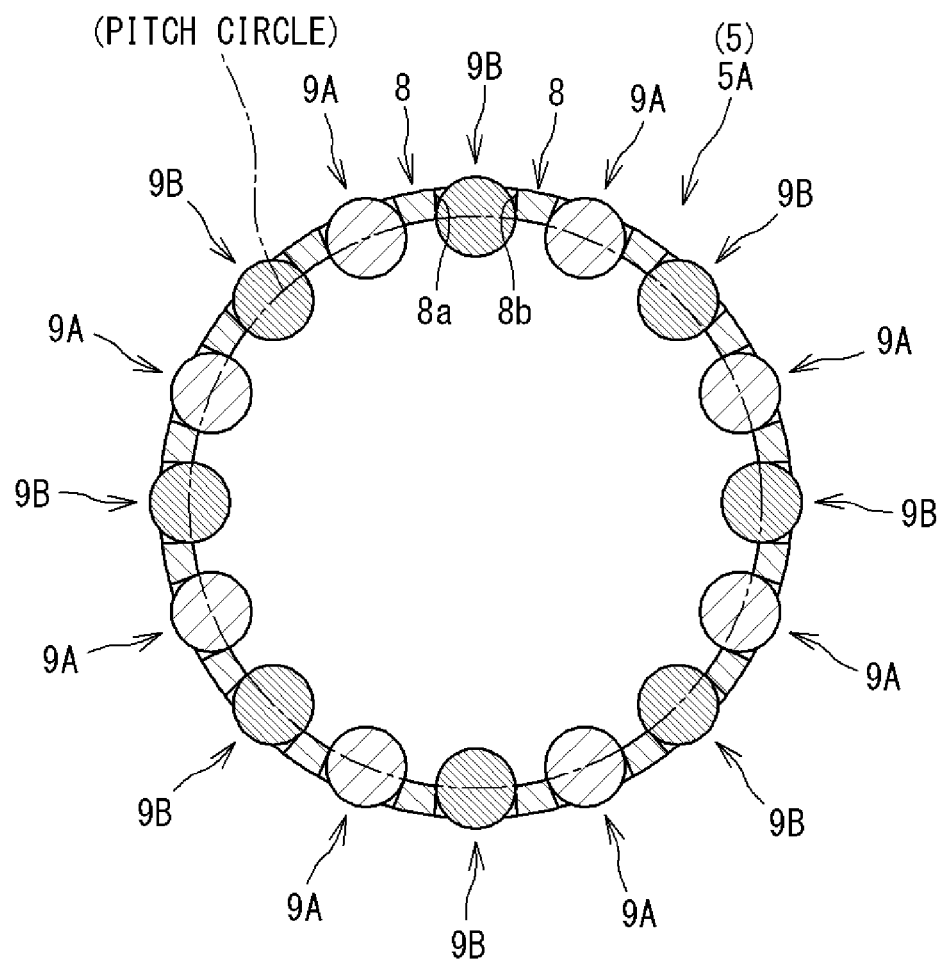
FIG. 9 is an image diagram of the cage and tapered rollers when viewed from the first side in the axial direction.

The cage 5A illustrated in FIG. 9 has a total of 16 pockets 9. Eight pockets which are a half of the 16 pockets are the second pockets 9B and the remaining eight pockets are the first pockets 9A. The second pockets 9B are spaced from each other in the circumferential direction of the cage 5A with one first pocket 9A therebetween. In the cage 5A, it is preferable that the first pockets 9A and the second pockets 9B are disposed as uniformly as possible in the circumferential direction. However, the first pockets 9A and the second pockets 9B may not be arranged completely uniformly like the cage 5A illustrated in FIG. 9. For example, in the cage 5A illustrated in FIG. 8A, there is one portion in which two first pockets 9A are consecutive between the second pockets 9B, but the first pockets 9A and the second pockets 9B disposed as described above with such a variation can be considered to be disposed uniformly in the circumferential direction.

In the cage 5A, the second pockets 9B are spaced from each other in the circumferential direction with the first pocket 9A therebetween. With this configuration, the first pockets 9A and the second pockets 9B are disposed uniformly in the circumferential direction of the cage 5. This configuration can suppress a variation in force applied to the cage 5A in the circumferential direction when the set 10 and the inner ring 2 are combined. Accordingly, intensive application of force on a part of the cage 5 during the operation of combining the set 10 and the inner ring 2 can be prevented. If a force is intensively applied to a part of the cage 5, a portion where the force is applied may be whitened or plastically deformed, or a crack may occur in the cage 5. However, the cage 5 can suppress an occurrence of defect such as a crack. Although the arrangement of the first pockets 9A and the second pockets 9B of the cage 5A has been described here as an example, the arrangement of the first pockets 9C and the second pockets 9D of the cage 5B and the arrangement of the first pockets 9E and the second pockets 9F of the cage 5C can be similarly described.

[Number of First Pockets and Second Pockets]

In the cage 5A illustrated in FIG. 8A, the number of the first pockets 9A is larger than the number of the second pockets 9B, and in the cage 5A illustrated in FIG. 9, the number of the first pockets 9A and the number of the second pockets 9B are the same. However, in the cage 5A according to the present disclosure, the number of the second pockets 9B may be larger than the number of the first pockets 9A. For example, when the number of the second pockets 9B is smaller than the number of the first pockets 9A as illustrated in FIG. 8A, it is possible to obtain a configuration in which the cage 5 is less likely to be displaced with respect to the inner ring 2. On the other hand, when the number of the second pockets 9B is larger than that of the first pockets 9A, it is possible to obtain a configuration that further facilitates the operation of combining the set 10 with the inner ring 2. Although the numbers of the first pockets 9A and the second pockets 9B of the cage 5A have been described here as an example, the numbers of the first pockets 9C and the second pockets 9D of the cage 5B and the numbers of the first pockets 9E and the second pockets 9F of the cage 5C can be similarly described.

[Assembly of Tapered Roller Bearing 1]

The tapered roller bearing 1 having the above configuration is assembled as follows. In the present disclosure, a procedure for assembling the tapered roller bearing 1 will be described based on the tapered roller bearing 1 including the cage 5A, but the tapered roller bearing 1 including the cage 5B or 5C can also be assembled in the same procedure as that for the tapered roller bearing 1 including the cage 5A.

Figure 10A:
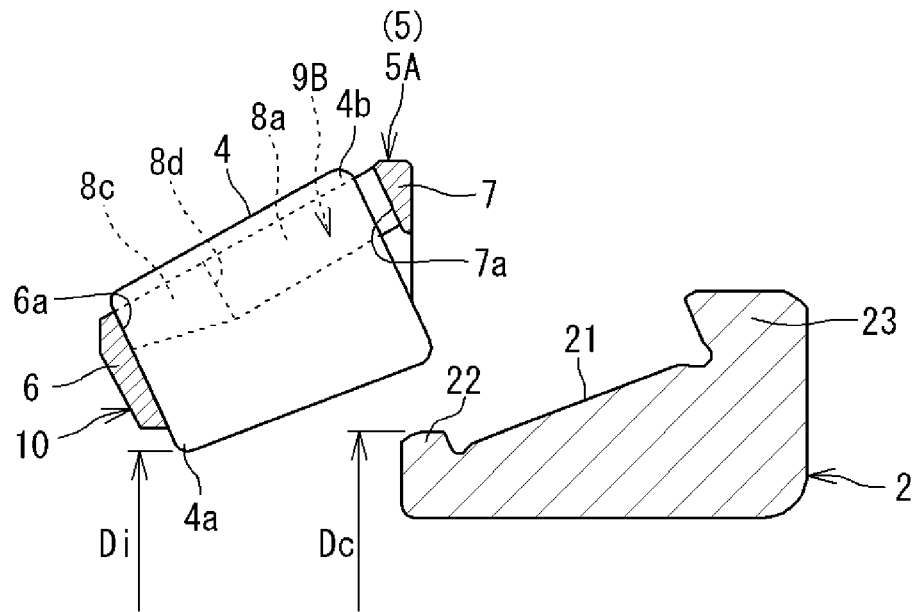
FIG. 10A is an explanatory diagram for describing an assembly procedure of the tapered roller bearing.
Figure 10B:
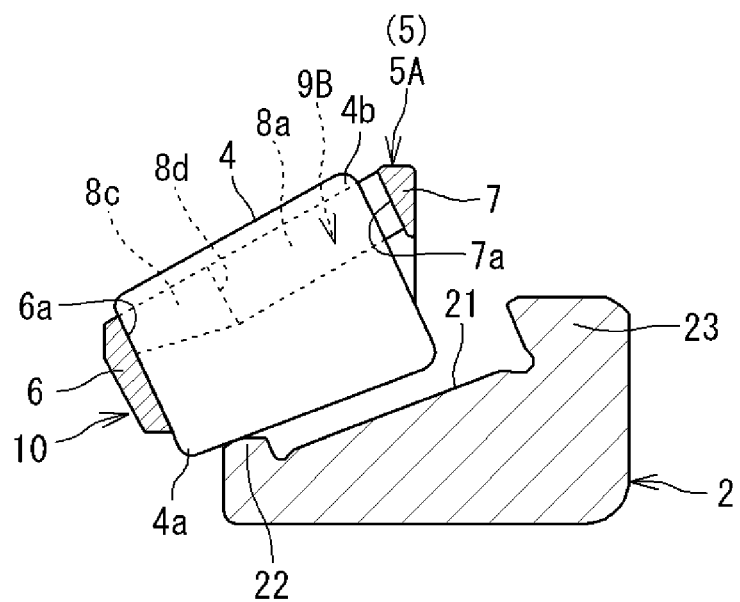
FIG. 10B is an explanatory diagram for describing the assembly procedure of the tapered roller bearing.

As illustrated in FIG. 10A, the tapered rollers 4 are accommodated in the pockets 9A and 9B from the inner peripheral side of the cage 5A, and the cage 5A and the tapered rollers 4 are combined. Thus, a set 10 of the plurality of tapered rollers 4 and the cage 5A is obtained. The set 10 is brought close to the inner ring 2 in the axial direction (see FIG. 10B) and is combined with the inner ring 2. In the state of the set 10 and at the time of installing the set 10, the tapered roller 4 accommodated in each of the pockets 9A and 9B is prevented from falling outward in the radial direction by the first lateral face 8a and the second lateral face 8b of the column 8 in each of the pockets 9A and 9B.

Figure 12:
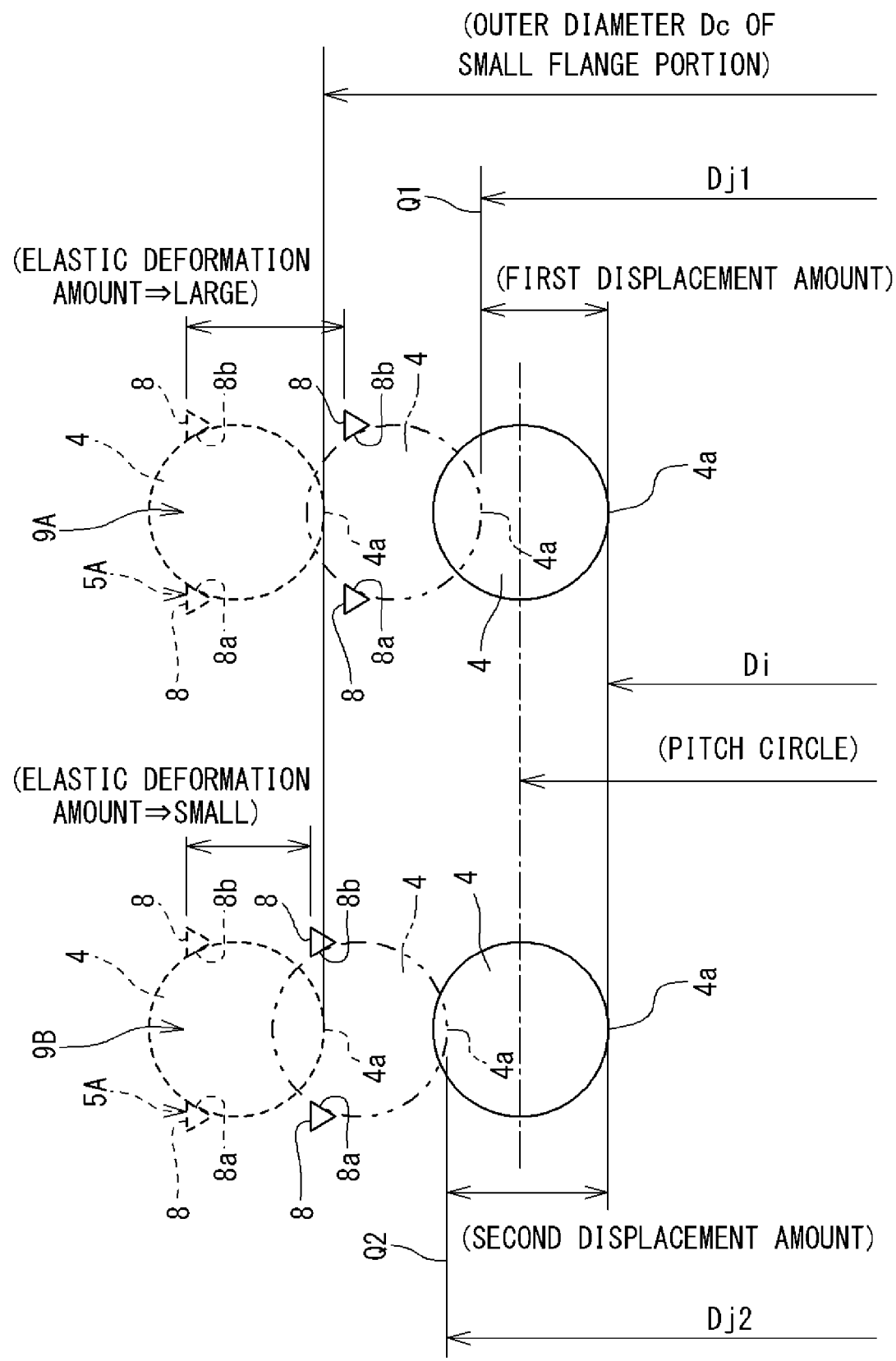
FIG. 12 is an image diagram for describing positions of tapered rollers in the first pocket and the second pocket.

FIG. 12 is an image diagram for describing the positions of the tapered rollers 4 in the first pocket 9A and the second pocket 9B. In the set 10, the diameter Di of the inscribed circle at the small-diameter-side portions 4a of the plurality of tapered rollers 4 located along the pitch circle is smaller than the outer diameter Dc of the small flange portion 22 of the inner ring 2 as illustrated in FIGS. 10A and 12.

Further, the diameter Dj1 (see FIG. 12) of the inscribed circle Q1 at the small-diameter-side portions 4a in a state where the tapered rollers 4 accommodated in the first pockets 9A are displaced radially outward and the diameter Dj2 (see FIG. 12) of the inscribed circle Q2 at the small-diameter-side portions 4a in a state where the tapered rollers 4 accommodated in the second pockets 9B are displaced radially outward are smaller than the outer diameter Dc of the small flange portion 22 of the inner ring 2. For this reason, during the operation of combining the set 10 with the inner ring 2 (see FIG. 10B), the small-diameter-side portions 4a of the tapered rollers 4 need to climb over the small flange portion 22, so that they are displaced radially outward. In order to allow the small-diameter-side portions 4a of the tapered rollers 4 to climb over the small flange portion 22, the inner ring 2 is pressed against the cage 5A in the axial direction to elastically deform a part of the cage 5A.

Figure 11A:
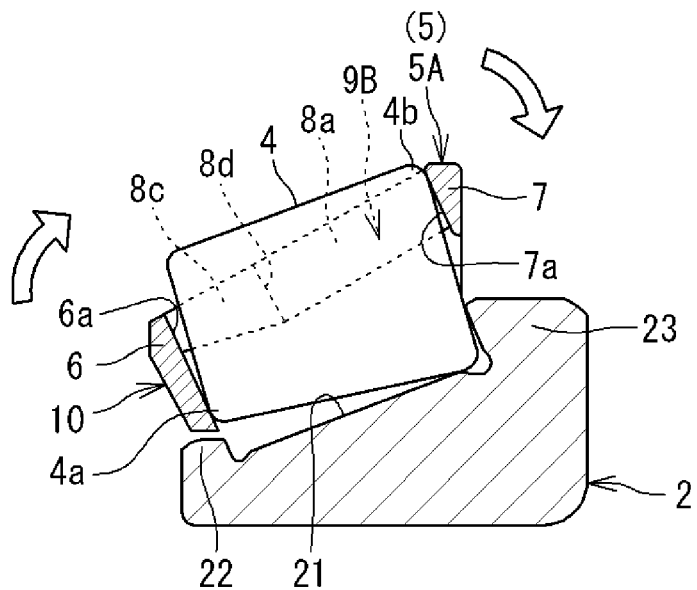
FIG. 11A is an explanatory diagram for describing the assembly procedure of the tapered roller bearing.

As illustrated in FIG. 11A, each of the tapered rollers 4 oscillates in a clockwise direction in FIG. 11A with a contact point with the boundary portion 8d as a supporting point. That is, the tapered rollers 4 oscillate such that the small-diameter-side portions 4a move radially outward. The displacement of the tapered rollers 4 accompanying oscillation as described above makes it easy for the small-diameter-side portions 4a to climb over the small flange portion 22.

Further, the cage 5A has two types of pockets 9A and 9B as described above. As described above, the second pocket 9B has the second displacement amount Y1 as the allowable amount of displacement having a radial component, and the second displacement amount Y1 is larger than the allowable amount of displacement (first displacement amount X1) in the first pocket 9A. That is, as compared with the tapered roller 4 in the first pocket 9A, the tapered roller 4 in the second pocket 9B has a larger allowable amount of displacement having a radial component. For this reason, in the second pocket 9B, only a small "elastic deformation amount (see the left diagram of FIG. 12)" is required in a part of the cage 5A, and the tapered roller 4 in the second pocket 9B easily climbs over the small flange portion 22 during the operation of combining the set 10 with the inner ring 2. This facilitates the operation of combining the set 10 with the inner ring 2. Even when the pressing force of the inner ring 2 in the axial direction is small, the small-diameter-side portions 4a of the tapered rollers 4 can easily climb over the small flange portion 22.

Each of the pockets 9A and 9B has the recessed portion 8c in the first lateral face 8a and the second lateral face 8b. A force required to generate certain deflection in the circumferential direction on the column 8 having the recessed portion 8c is smaller than a force required to generate deflection on a column having no recessed portion 8c, and thus, only a small force is required to elastically deform a part of the cage 5A. Therefore, the tapered rollers 4 in the pockets 9A and 9B climb over the small flange portion 22 with a smaller force than in a case where the recessed portion 8c is not provided. Thus, even when the pressing force of the inner ring 2 in the axial direction is small, the small-diameter-side portions 4a of the tapered rollers 4 can easily climb over the small flange portion 22. This further facilitates the operation of combining the set 10 with the inner ring 2.

In each of the pockets 9A and 9B, the recessed portion Sc is formed on the first side in the axial direction of the first lateral face 8a and the second lateral face 8b. In this configuration, when the tapered roller 4 accommodated in each of the pockets 9A and 9B is inclined and comes into contact with the boundary portion 8d between the first lateral face 8a and the second lateral face 8b, the tapered roller 4 can press the position near the center of the column 8 in the longitudinal direction. A smaller force is required to generate certain deflection in the circumferential direction and in the radial direction of the cage 5A when the position near the center of the column 8 in the longitudinal direction is pressed than when the end of the column 8 in the longitudinal direction is pressed. Therefore, the cage 5A can be elastically deformed with a smaller force. Thus, even when the pressing force of the inner ring 2 in the axial direction is small, the small-diameter-side portions 4a of the tapered rollers 4 can easily climb over the small flange portion 22. This further facilitates the operation of combining the set 10 with the inner ring 2.

Figure 11B:
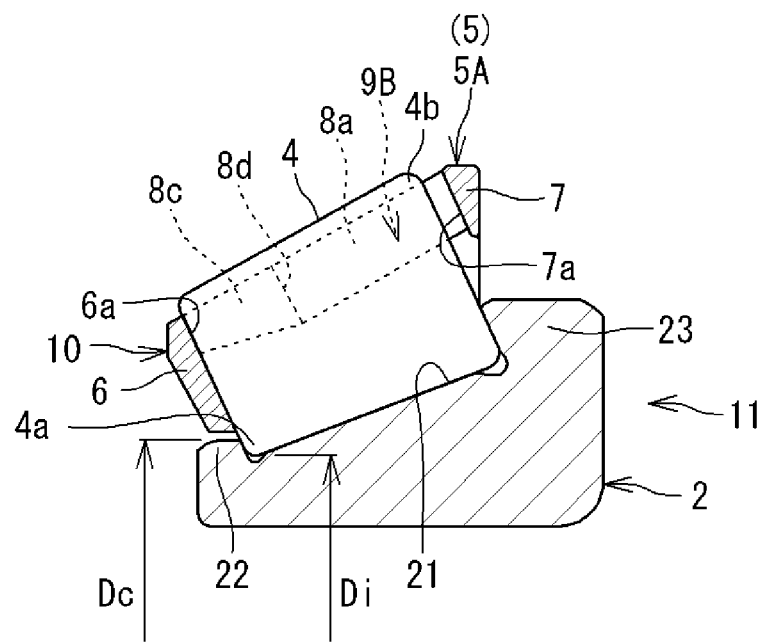
FIG. 11B is an explanatory diagram for describing the assembly procedure of the tapered roller bearing.

When the set 10 and the inner ring 2 are combined to obtain the inner ring unit 11 as illustrated in FIG. 11B, the tapered roller 4 in the first pocket 9A is less likely to be displaced relative to the cage 5A. This is because the first pocket 9A has the "first displacement amount" smaller than the "second displacement amount" as the allowable amount of displacement having the radial component of the tapered roller 4 as illustrated in FIG. 12. The cage 5A is less likely to be displaced with respect to the inner ring 2, whereby not only the tapered roller 4 retained in the first pocket 9A of the cage 5A but also the tapered roller 4 retained in the second pocket 9B are less likely to be displaced in the radial direction as a whole. In the first pocket 9A in the inner ring unit 11, an external force large enough to generate a large "elastic deformation amount (see the right diagram of FIG. 12)" in a part of the cage 5A is required in order to allow the tapered roller 4 to climb over the small flange portion 22, so that it is difficult for the tapered roller 4 to climb over the small flange portion 22.

In the state of the inner ring unit 11 illustrated in FIG. 11B, when the tapered roller 4 in each of the pockets 9 is inclined to be displaced in the radial direction, the displacement is restricted by the small-diameter-side lateral face 6a. Therefore, the inner ring unit 11 is less likely to come apart.

According to the above assembling method, the inner ring unit 11 in which the inner ring 2, the cage 5A, and the tapered rollers 4 are integrated is obtained. The outer ring 3 is installed to the inner ring unit 11, and thus, the tapered roller bearing 1 is completed.

If all the pockets 9 of the cage 5A are the first pockets 9A each having a smaller allowable amount of displacement than the second pocket 9B, a large force (load) is required for combining the set 10 with the inner ring 2 during the operation of combining the set 10 with the inner ring 2. Thus, the operation of combining them is difficult. Alternatively, if all the pockets 9 of the cage 5A are the second pockets 9B each having a larger allowable amount of displacement than the first pocket 9A, the tapered rollers 4 and the cage 5A in the inner ring unit 11 are likely to come apart from the inner ring 2.

On the other hand, the plurality of pockets 9 included in the cage 5A according to the present disclosure includes the first pocket 9A having the "first displacement amount X1" as the allowable amount of displacement and the second pocket 9B having the "second displacement amount Y1" larger than the "first displacement amount X1" as the allowable amount of displacement. This configuration can achieve facilitating the operation of combining the set 10 of the cage 5A and the plurality of tapered rollers 4 with the inner ring 2 and preventing the inner ring unit 11 obtained by combining the set 10 with the inner ring 2 from coming apart.

[First Modification of Cage]

A cage 5D according to a modification will be described with reference to FIGS. 13A and 13B. In the following description, a "first pocket" in the cage 5D is referred to as a first pocket 9G, and a "second pocket" in the cage 5D is referred to as a second pocket 9H to be distinguished from the "first pockets" and the "second pockets" in the cages 5 according to the other modes. In the following description, portions of the cage 5D common to those of the cages 5A to 5C are denoted by the reference numerals used in the description of the cages 5A to 5C, and the description thereof will be omitted unless otherwise specified.

Figure 13A:
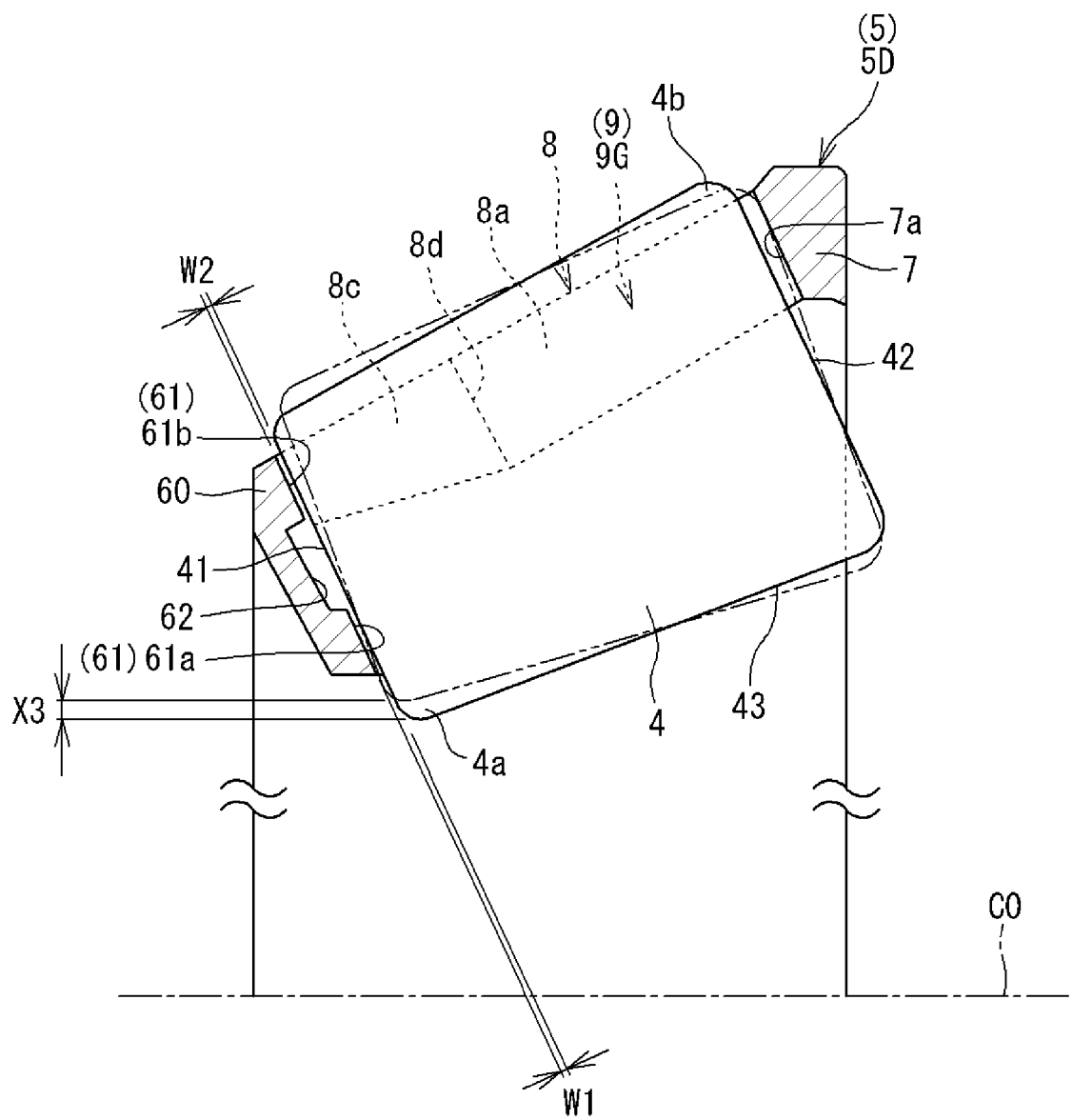
FIG. 13A is a cross-sectional view taken along a centerline of a cage including a first pocket according to a modification.
Figure 13B:
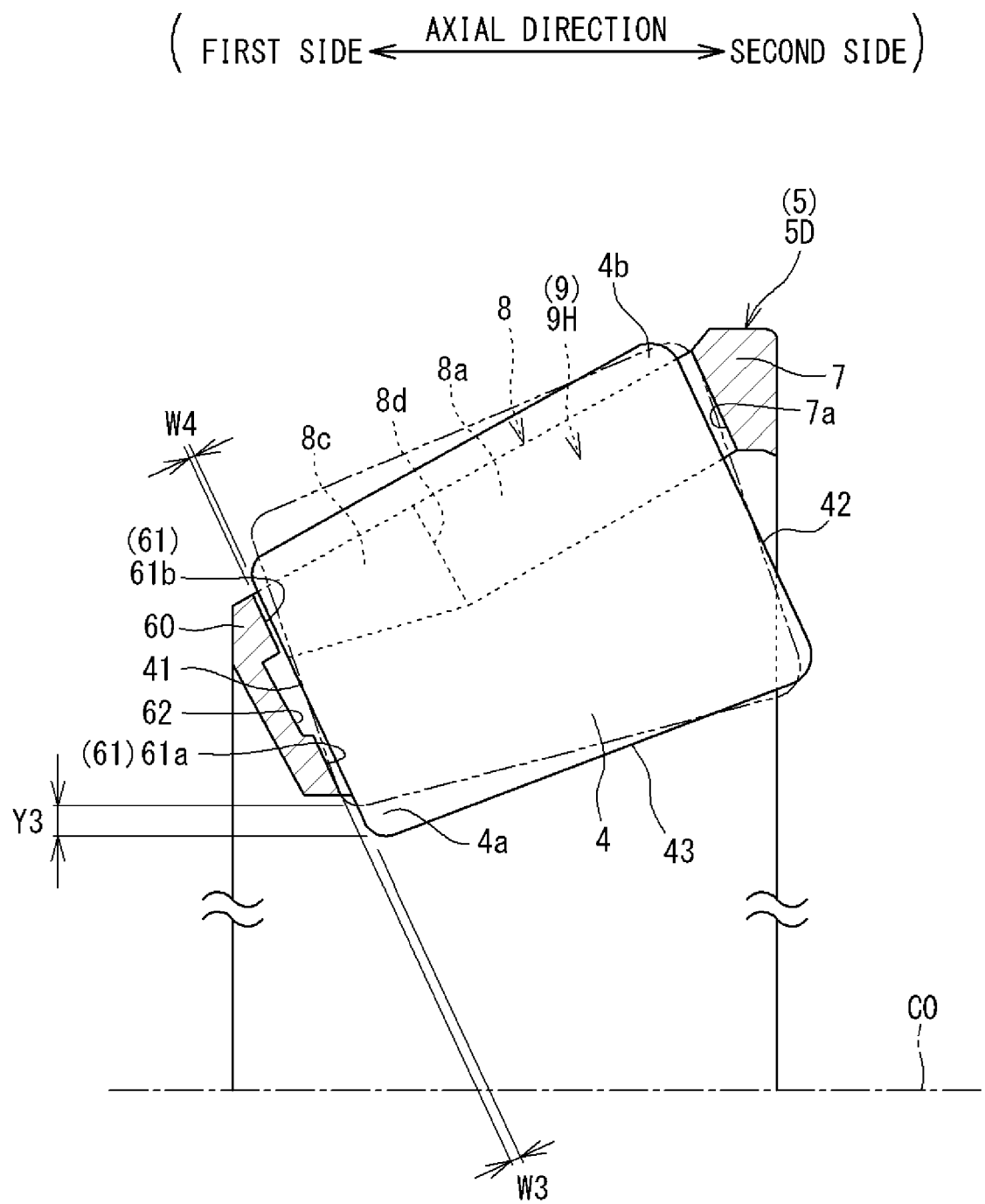
FIG. 13B is a cross-sectional view taken along the centerline of the cage including a second pocket according to the modification.

FIGS. 13A and 13B are diagrams partially illustrating a cross section of the cage 5D including a centerline C0. FIG. 13A is a diagram illustrating a cross section including the first pocket 9G, and FIG. 13B is a diagram illustrating a cross section including the second pocket 9H. Similar to the second pockets 9B (FIG. 8A or FIG. 9) according to the first mode, the second pockets 9H are spaced from each other in the circumferential direction of the cage 5D with one or a plurality of first pockets 9G interposed therebetween.

The cage 5D includes a small-diameter annular body 60 on the first side in the axial direction, a large-diameter annular body 7 on the second side in the axial direction, and a plurality of columns 8 connecting the small-diameter annular body 60 and the large-diameter annular body 7. The shape of the small-diameter annular body 60 in the present modification is different from the shape of the small-diameter annular body 6 of the cage 5A. The small-diameter annular body 60 has a plurality of small-diameter-side lateral faces 61 respectively facing the small-diameter-side end faces 41 of the tapered rollers 4 respectively accommodated in the plurality of pockets 9.

Each of the plurality of small-diameter-side lateral faces 61 has a small-diameter-side first lateral face 61a located on an inner side in the radial direction of the cage 5D and a small-diameter-side second lateral face 61b located further to an outer side in the radial direction of the cage 5D with respect to the small-diameter-side first lateral face 61a. In the radial direction of the cage 5D, a recess 62 is provided between the small-diameter-side first lateral face 61a and the small-diameter-side second lateral face 61b. The recess 62 is provided to reduce the rigidity of the small-diameter annular body 60 and reduce a force required to deflect the column 8 by a certain amount or more during assembly of the tapered roller bearing 1.

It is not necessary to provide the recess 62, and the recess 62 may not be provided between the small-diameter-side first lateral face 61a and the small-diameter-side second lateral face 61b. That is, the small-diameter-side first lateral face 61a and the small-diameter-side second lateral face 61b may be directly connected in the radial direction.

As illustrated in FIG. 13A, a distance W1 ("third distance" in the present invention) between the small-diameter-side first lateral face 61a facing the first pocket 9G and the small-diameter-side end face 41 is equal to a distance W2 between the small-diameter-side second lateral face 61b facing the first pocket 9G and the small-diameter-side end face 41 (W1=W2). Therefore, the small-diameter-side first lateral face 61a and the small-diameter-side second lateral face 61b facing the first pocket 9G are located on the same plane. Note that the distance W1 may be larger than the distance W2.

As illustrated in FIGS. 13A and 13B, a distance W3 ("fourth distance" in the present invention) between the small-diameter-side first lateral face 61a facing the second pocket 9H and the small-diameter-side end face 41 is larger than the distance W1 between the small-diameter-side first lateral face 61a facing the first pocket 9G and the small-diameter-side end face 41 (W3>W1). In addition, the distance W3 is larger than a distance W4 ("fifth distance" in the present invention) between the small-diameter-side second lateral face 61b facing the second pocket 9H and the small-diameter-side end face 41 (W3>W4). The distance W4 is equal to the distance W2 (W4=W2).

Therefore, comparing the small-diameter-side lateral face 61 facing the first pocket 9G and the small-diameter-side lateral face 61 facing the second pocket 9H, the positions of the small-diameter-side second lateral face 61b with respect to the small-diameter-side end face 41 are the same, while the small-diameter-side first lateral face 61a facing the second pocket 9H has a larger gap with respect to the small-diameter-side end face 41 than the small-diameter-side first lateral face 61*a* facing the first pocket 9G.

Since there is a larger gap between the small-diameter-side first lateral face 61*a* facing the second pocket 9H and the small-diameter-side end face 41, an allowable amount of displacement (second displacement amount Y3) of the small-diameter-side portion 4*a* of the tapered roller 4 accommodated in the second pocket 9H to the outside in the radial direction is larger than an allowable amount of displacement (first displacement amount X3) of the small-diameter-side portion 4*a* of the tapered roller 4 accommodated in the first pocket 9G to the outside in the radial direction (Y3>X3).

As described above, according to the cage 5D of the present modification, the tapered roller 4 accommodated in the second pocket 9H have a larger allowable amount of displacement than the tapered roller 4 accommodated in the first pocket 9G. Thus, an operation of combining the set 10 obtained by integrating the cage 5D and the plurality of tapered rollers 4 with the inner ring 2 is facilitated as compared with a cage in which all the pockets 9 are the first pockets 9G. In addition, the inner ring unit 11 obtained by integrating the inner ring 2, the cage 5D, and the plurality of tapered rollers 4 is less likely to come apart as compared with a cage in which all the pockets 9 are the second pockets 9H.

In the first pocket 9G and the second pocket 9H in the present modification, the distances W2 and W4 between the small-diameter-side second lateral faces 61*b* and the small-diameter-side end faces 41 are the same, and the distances W2 and W4 are smaller than the distance W3. With such a configuration, the allowable amount of displacement of the small-diameter-side portion 4*a* of the tapered roller 4 accommodated in the second pocket 9H "to the inside in the radial direction" hardly changes from the allowable amount of displacement of the small-diameter-side portion 4*a* of the tapered roller 4 accommodated in the first pocket 9G "to the inside in the radial direction". Therefore, it is possible to increase an allowable amount of displacement (that is, the second displacement amount Y3) in a predetermined displacement direction (a direction in which the small-diameter-side portion 4*a* is inclined radially outward) necessary for assembly while suppressing displacement of the tapered roller 4 accommodated in the second pocket 9H in an unintended direction (for example, in a direction in which the small-diameter-side portion 4*a* is inclined radially inward).

[Second Modification of Cage]

A cage 5E according to a modification will be described with reference to FIGS. 14A and 14B. In the following description, a "first pocket" in the cage 5E is referred to as a first pocket 9I, and a "second pocket" in the cage 5E is referred to as a second pocket 9J to be distinguished from the "first pockets" and the "second pockets" in the cages 5 according to the other modes. In the following description, portions of the cage 5E common to those of the cages 5A to 5D are denoted by the reference numerals used in the description of the cages 5A to 5D, and the description thereof will be omitted unless otherwise specified.

Figure 14A:
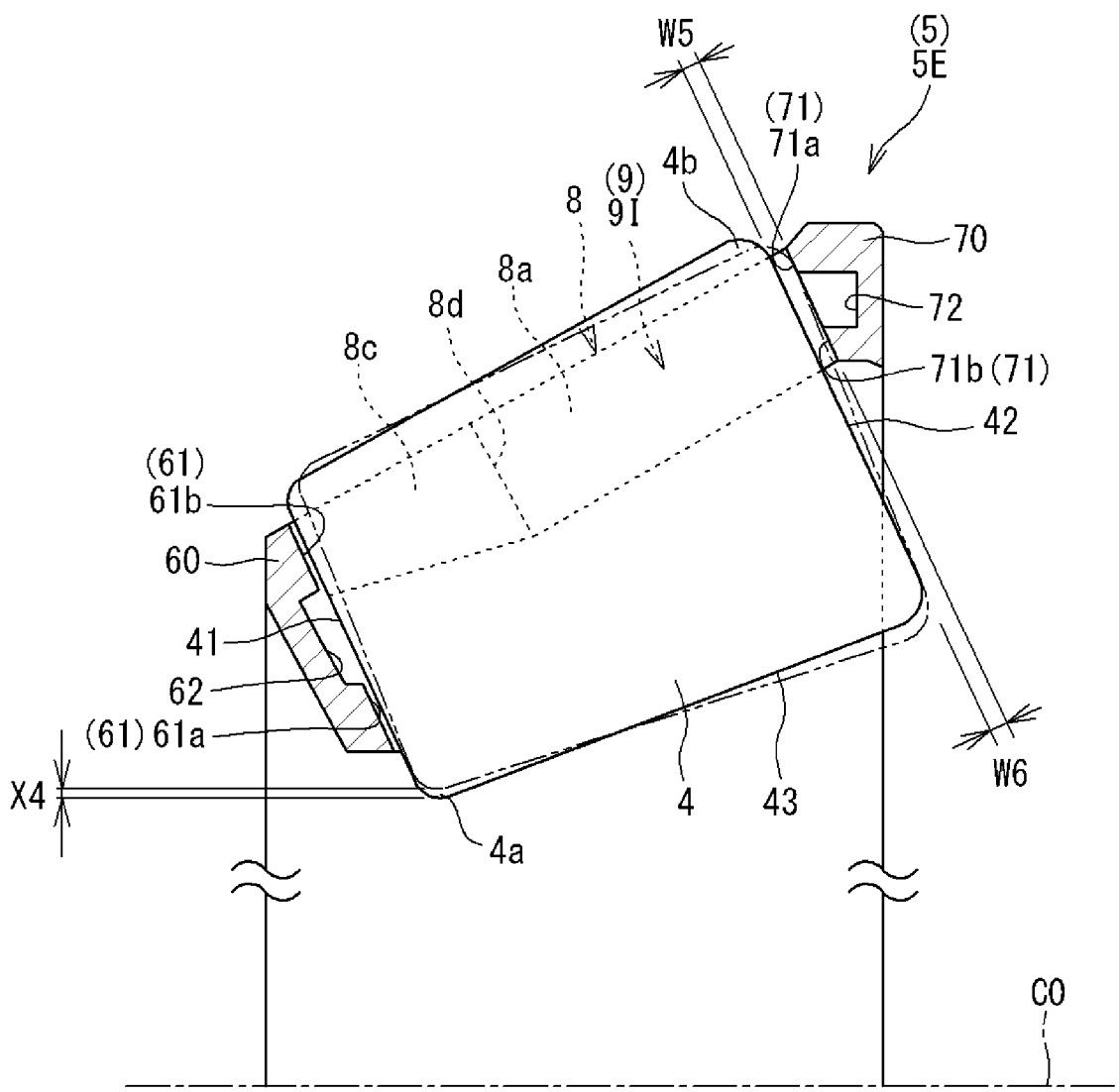
FIG. 14A is a cross-sectional view taken along a centerline of a cage including a first pocket according to a modification.
Figure 14B:
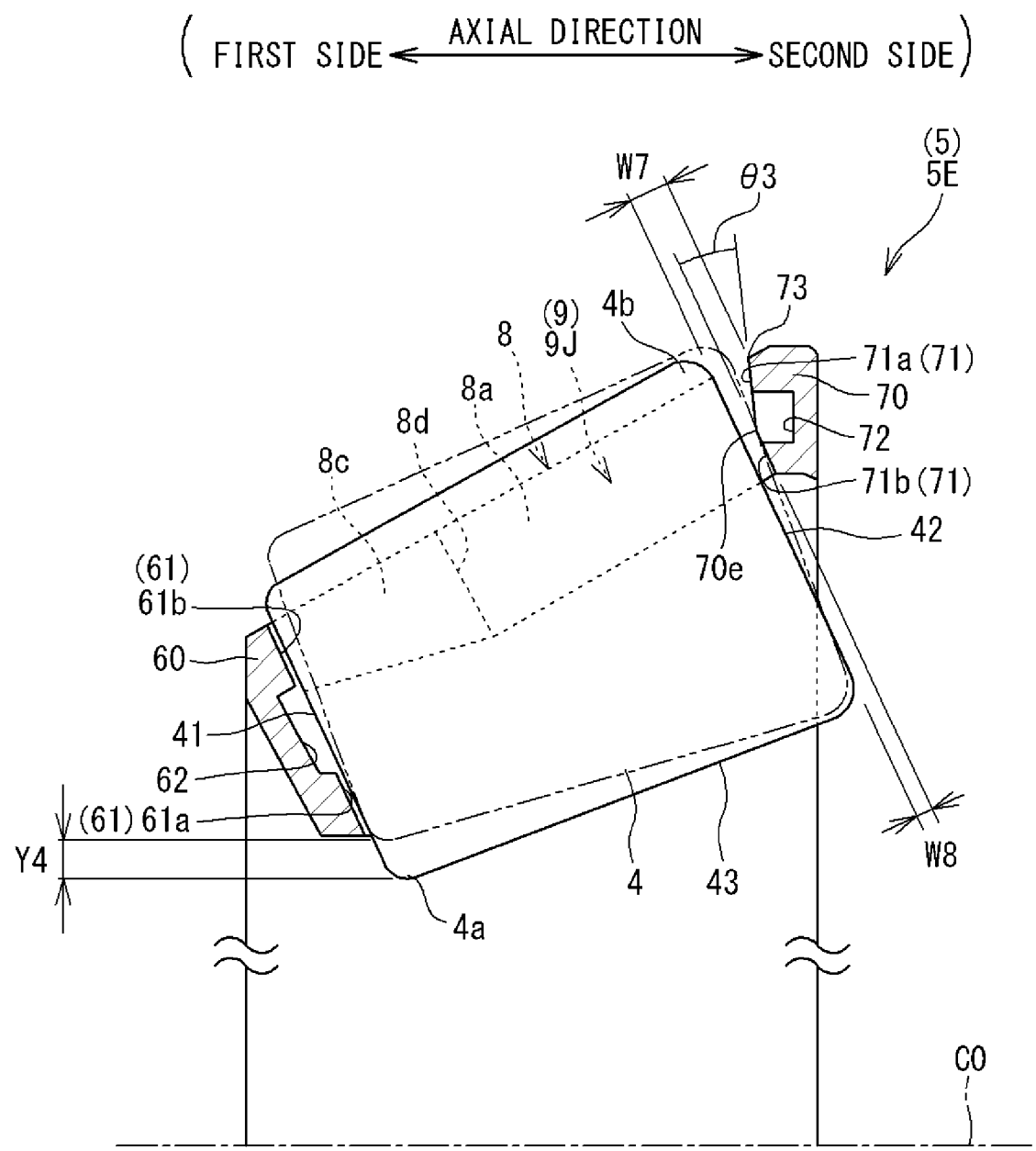
FIG. 14B is a cross-sectional view taken along the centerline of the cage including a second pocket according to the modification.
Figure 15A:
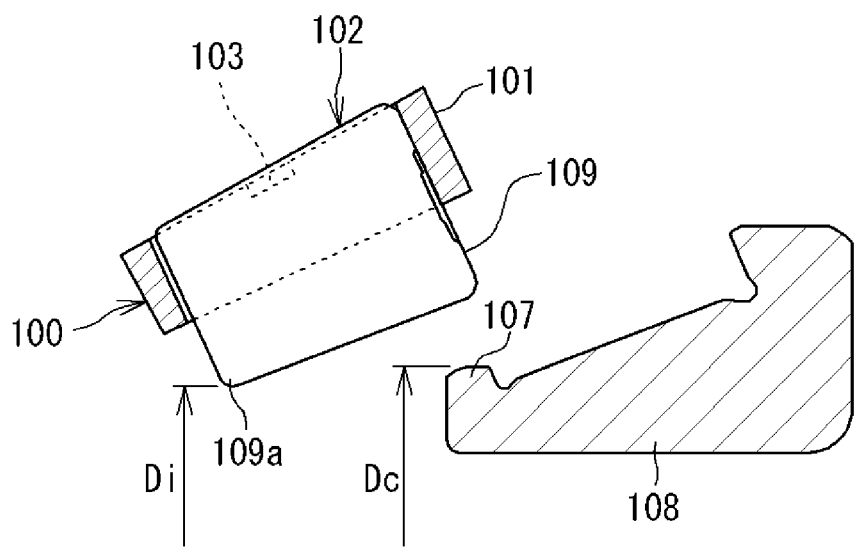
FIG. 15A is an explanatory diagram for describing an assembly procedure of a conventional tapered roller bearing.
Figure 15B:
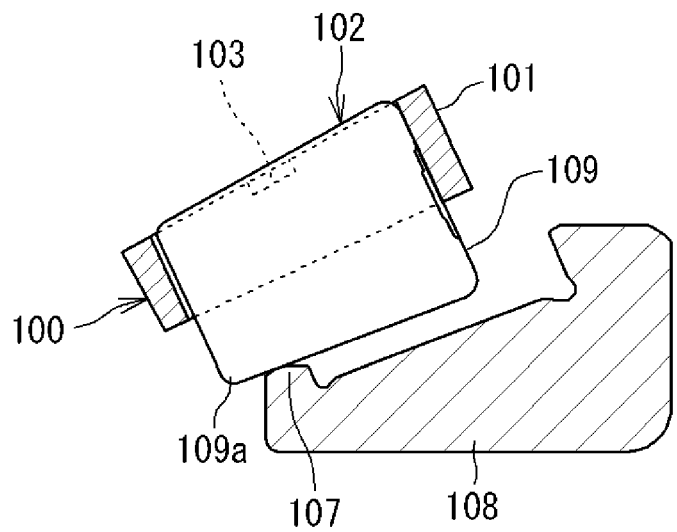
FIG. 15B is an explanatory diagram for describing the assembly procedure of the conventional tapered roller bearing.

FIGS. 14A and 14B are diagrams partially illustrating a cross section of the cage 5E including a centerline C0. FIG. 14A is a diagram illustrating a cross section including the first pocket 9I, and FIG. 14B is a diagram illustrating a cross section including the second pocket 9J. Similar to the second pockets 9B (FIG. 8A or FIG. 9) according to the first mode, the second pockets 9J are spaced from each other in the circumferential direction of the cage 5E with one or a plurality of first pockets 9I interposed therebetween.

The cage 5E includes a small-diameter annular body 60 on the first side in the axial direction, a large-diameter annular body 70 on the second side in the axial direction, and a plurality of columns 8 connecting the small-diameter annular body 60 and the large-diameter annular body 70. The shapes of the small-diameter annular body 60 and the large-diameter annular body 70 in the present modification are different from the shapes of the small-diameter annular body 6 and the large-diameter annular body 7 of the cage 5A.

A small-diameter-side lateral face 61 included in the small-diameter annular body 60 of the cage 5E has the same shape as the small-diameter-side lateral face 61 facing the first pocket 9G of the cage 5D in both the portion facing the first pocket 9I and the portion facing the second pocket 9J. That is, in the present modification, there is no difference in the shape of the small-diameter annular body 60 between the first pocket 9I and the second pocket 9J.

The large-diameter annular body 70 has a plurality of large-diameter-side lateral faces 71 respectively facing the large-diameter-side end faces 42 of the tapered rollers 4 respectively accommodated in the plurality of pockets 9 of the cage 5E. Each of the plurality of large-diameter-side lateral faces 71 has a large-diameter-side first lateral face 71*a* located on an outer side in the radial direction of the cage 5E and a large-diameter-side second lateral face 71*b* located further to an inner side in the radial direction of the cage 5E with respect to the large-diameter-side first lateral face 71*a*. In the radial direction of the cage 5E, a recess 72 is provided between the large-diameter-side first lateral face 71*a* and the large-diameter-side second lateral face 71*b*. The recess 72 is provided as an oil groove for holding lubricating oil that lubricates each part of the roller bearing 1.

It is not necessary to provide the recess 72, and the recess 72 may not be provided between the large-diameter-side first lateral face 71*a* and the large-diameter-side second lateral face 71*b*. That is, the large-diameter-side first lateral face 71*a* and the large-diameter-side second lateral face 71*b* may be directly connected in the radial direction.

As illustrated in FIG. 14A, a distance W5 ("sixth distance" in the present invention) between the large-diameter-side first lateral face 71*a* facing the first pocket 9I and the large-diameter-side end face 42 is equal to a distance W6 between the large-diameter-side second lateral face 71*b* facing the first pocket 9I and the large-diameter-side end face 42 (W5=W6). Therefore, the large-diameter-side first lateral face 71*a* and the large-diameter-side second lateral face 71*b* facing the first pocket 9I are located on the same plane. Note that the distance W5 may be larger than the distance W6.

As illustrated in FIG. 14B, the large-diameter-side first lateral face 71*a* facing the second pocket 9J is inclined to the second side in the axial direction by an angle θ3 as compared with the large-diameter-side second lateral face 71*b* facing the second pocket 9J. Therefore, a distance W7 ("seventh distance" in the present invention) between a radially outer end 73 of the large-diameter-side first lateral face 71*a* facing the second pocket 9J and the large-diameter-side end face 42 is larger than the distance W5 (W7>W5). In addition, the distance W7 is larger than a distance W8 ("eighth distance" in the present invention) between the large-diameter-side second lateral face 71*b* facing the second pocket 9J and the large-diameter-side end face 42 (W7>W8). The distance W8 is equal to the distance W6 (W8=W6).

Therefore, comparing the large-diameter-side lateral face 71 facing the first pocket 9I and the large-diameter-side lateral face 71 facing the second pocket 9J, the positions of the large-diameter-side second lateral face 71b with respect to the large-diameter-side end face 42 are the same, while the large-diameter-side first lateral face 71a facing the second pocket 9J has a larger gap with respect to the large-diameter-side end face 42 than the large-diameter-side first lateral face 71a facing the first pocket 9I.

Since there is a larger gap between the large-diameter-side first lateral face 71a facing the second pocket 9J and the large-diameter-side end face 42, an allowable amount of displacement of the large-diameter-side portion 4b of the tapered roller 4 accommodated in the second pocket 9J to the inside in the radial direction is larger than an allowable amount of displacement of the large-diameter-side portion 4b of the tapered roller 4 accommodated in the first pocket 9I to the inside in the radial direction. Thus, the allowable amount of displacement (second displacement amount Y4) of the small-diameter-side portion 4a of the tapered roller 4 accommodated in the second pocket 9J to the outside in the radial direction is larger than the allowable amount of displacement (first displacement amount X4) of the small-diameter-side portion 4a of the tapered roller 4 accommodated in the first pocket 9I to the outside in the radial direction (Y4>X4).

As described above, according to the cage 5E of the present modification, the tapered roller 4 accommodated in the second pocket 9J have a larger allowable amount of displacement than the tapered roller 4 accommodated in the first pocket 9I. Thus, an operation of combining the set 10 obtained by integrating the cage 5E and the plurality of tapered rollers 4 with the inner ring 2 is facilitated as compared with a cage in which all the pockets 9 are the first pockets 9I. In addition, the inner ring unit 11 obtained by integrating the inner ring 2, the cage 5E, and the plurality of tapered rollers 4 is less likely to come apart as compared with a cage in which all the pockets 9 are the second pockets 9J.

In the first pocket 9I and the second pocket 9J in the present modification, the distances W6 and W8 between the large-diameter-side second lateral faces 71b and the large-diameter-side end faces 42 are the same, and the distances W6 and W8 are smaller than the distance W7. With such a configuration, the allowable amount of displacement of the large-diameter-side portion 4b of the tapered roller 4 accommodated in the second pocket 9J "to the outside in the radial direction" hardly changes from the allowable amount of displacement of the large-diameter-side portion 4b of the tapered roller 4 accommodated in the first pocket 9I "to the outside in the radial direction". Therefore, it is possible to increase an allowable amount of displacement (that is, the second displacement amount Y4) in a predetermined displacement direction (a direction in which the large-diameter-side portion 4b is inclined radially inward) necessary for assembly while suppressing displacement of the tapered roller 4 accommodated in the second pocket 9J in an unintended direction (for example, in a direction in which the large-diameter-side portion 4b is inclined radially outward).

In the cage 5A according to the first mode, the large-diameter-side lateral face 7a facing the second pocket 9B is positioned further to the second side in the axial direction as a whole as compared with the large-diameter-side lateral face 7a facing the first pocket 9A. Therefore, when the tapered rollers 4 rotate, the large-diameter-side lateral faces 7a facing the first pockets 9A easily come into contact with the large-diameter-side end faces 42, but the large-diameter-side lateral faces 7a facing the second pockets 9B are less likely to come into contact with the large-diameter-side end faces 42 due to a large gap with the large-diameter-side end faces 42. As a result, the number of large-diameter-side lateral faces 7a coming in contact with the tapered rollers 4 is reduced due to the second pockets 9B being provided, and the contact surface pressure between the large-diameter-side lateral faces 7a facing the first pockets 9A and the large-diameter-side end faces 42 tends to increase. When the contact surface pressure between the large-diameter-side lateral face 7a and the large-diameter-side end face 42 increases, the cage may be likely to be worn.

On the other hand, in the cage 5E according to the present modification, the large-diameter-side second lateral face 71b facing the second pocket 9J is located at the same position as the large-diameter-side second lateral face 71b facing the first pocket 9I. Therefore, when the tapered rollers 4 rotate, ease of contact between the large-diameter-side second lateral face 71b facing the first pocket 9I and the large-diameter-side end face 42 and ease of contact between the large-diameter-side second lateral face 71b facing the second pocket 9J and the large-diameter-side end face 42 are in substantially the same level. As a result, even when the second displacement amount Y4 of the tapered roller 4 is further increased in the second pocket 9J, the number of the large-diameter-side lateral faces 71 coming in contact with the tapered rollers 4 is about the same as the number of the pockets 9, and thus, it is possible to suppress an increase in contact surface pressure between the large-diameter-side lateral face 71 and the large-diameter-side end face 42. Accordingly, wear of the cage 5E can be suppressed.

The above modes and modifications may be combined. For example, the cages 5D and 5E according to the modifications may be combined with the second mode described above. Specifically, in the cage 5D (or 5E), the angle θ2 between the first lateral face 8a and the second lateral face 8b in the second pocket 9H (or 9J) may be smaller than the angle θ1 between the first lateral face 8a and the second lateral face 8b in the first pocket 9G (or 9I).

Other Modifications

In the above disclosure, the single row tapered roller bearing 1 in which the plurality of tapered rollers 4 is arranged in a row in the circumferential direction has been described. Although not illustrated, a cage of a double row tapered roller bearing may have the above-described configuration. As another mode, when a part of a wheel bearing device (also referred to as a hub unit) that supports a wheel of an automobile is constituted by a tapered roller bearing, that is, when the wheel bearing device has tapered rollers as rolling elements in a part thereof, a cage that holds the tapered rollers may have the above-described configuration.

The modes disclosed herein are illustrative in all respects and are not restrictive. The scope of rights of the present invention is not limited to the abovementioned modes, and includes all modifications within the scope equivalent to the configuration described in the claims.

REFERENCE SIGNS LIST 1 tapered roller bearing
2 inner ring
21 inner ring raceway
22 small flange portion
23 large flange portion 24 lateral face (flange face)
3 outer ring
31 outer ring raceway
4a small-diameter-side portion
4b large-diameter-side portion
4d boundary portion
41 small-diameter-side end face
42 large-diameter-side end face
43 outer peripheral surface
5, 5A, 5B, 5C, 5D, 5E cage
6 small-diameter annular body
60 small-diameter annular body
6a small-diameter-side lateral face
61 small-diameter-side lateral face
61a small-diameter-side first lateral face
61b small-diameter-side second lateral face
62 recess
7 large-diameter annular body
70 large-diameter annular body
7a large-diameter-side lateral face
71 large-diameter-side lateral face
71a large-diameter-side first lateral face
71b large-diameter-side second lateral face
72 recess
73 end
8 column
8a first lateral face
8b second lateral face
8c recessed portion
8d boundary portion
9 pocket
9A first pocket
9B second pocket
9C first pocket
9D second pocket
9E first pocket
9F second pocket
9G first pocket
9H second pocket
9I first pocket
9J second pocket
10 set
11 inner ring unit
100 set
101 cage
102 pocket
103 retaining portion
107 small flange portion
108 inner ring
109 tapered roller
109a small-diameter-side portion
C1 centerline
L1 first distance
L2 second distance
W1 distance
W2 distance (third distance)
W3 distance (fourth distance)
W4 distance (fifth distance)
W5 distance (sixth distance)
W6 distance
W7 distance (seventh distance)
W8 distance (eighth distance)
θ1 first angle
θ2 second angle
θ3 angle
D1 gap
D2 gap
K1 gap
K2 gap
Q1 circle
Q2 circle
Dj1 diameter
Dj2 diameter
X1 first displacement amount
X2 first displacement amount
X3 first displacement amount
X4 first displacement amount
Y1 second displacement amount
Y2 second displacement amount
Y3 second displacement amount
Y4 second displacement amount

The invention claimed is:

1. A tapered roller bearing comprising:
an inner ring that has an inner ring raceway provided on an outer peripheral side, a small flange portion provided on a first side of the inner ring raceway in an axial direction, and a large flange portion provided on a second side of the inner ring raceway in the axial direction, the large flange portion having a larger diameter than the small flange portion;
an outer ring that has an outer ring raceway on an inner peripheral side;
a plurality of tapered rollers in rolling contact with the inner ring raceway and the outer ring raceway; and
a cage that is annular and has a plurality of pockets for accommodating the tapered rollers, wherein
the cage has a plurality of first lateral faces facing outer peripheral surfaces of the tapered rollers accommodated in the plurality of pockets from a first side in a circumferential direction of the cage and a plurality of second lateral faces facing the outer peripheral surfaces of the tapered rollers from a second side in the circumferential direction of the cage,
the plurality of pockets includes a first pocket which defines a first angle between the first lateral face and the second lateral face, and a second pocket which defines a second angle smaller than the first angle between the first lateral face and the second lateral face, and
each of the first angle and the second angle is defined by a first line and a second line crossing each other, the first line passing through a radially inner end and a radially outer end of the first lateral faces in a cross section of the cage taken along a plane perpendicular to an axial direction of each of the tapered rollers, the second line passing through a radially inner end and a radially outer end of the second lateral faces in the cross section of the cage.

2. The tapered roller bearing according to claim 1, wherein the first lateral face and the second lateral face in the second pocket have, on the first side in the axial direction, a recessed portion that increases a gap between the tapered roller accommodated in the second pocket and the first and second lateral faces.

3. The tapered roller bearing according to claim 1, wherein, in relation to a radial direction of the cage, the first lateral faces and the second lateral faces are provided to form a first gap with the tapered roller accommodated in the first pocket and are provided to form a second gap larger than the first gap with the tapered roller accommodated in the second pocket.

4. The tapered roller bearing according to claim 1, wherein
the cage includes a plurality of small-diameter-side lateral faces respectively facing small-diameter-side end faces of the tapered rollers respectively accommodated in the plurality of pockets, and a plurality of large-diameter-side lateral faces respectively facing large-diameter-side end faces of the tapered rollers respectively accommodated in the plurality of pockets, and when a distance between the small-diameter-side lateral face and the large-diameter-side lateral face in the first pocket is defined as a first distance, a distance between the small-diameter-side lateral face and the large-diameter-side lateral face in the second pocket is a second distance larger than the first distance.

5. The tapered roller bearing according to claim 1, wherein the cage includes a plurality of small-diameter-side lateral faces respectively facing small-diameter-side end faces of the tapered rollers respectively accommodated in the plurality of pockets, each of the small-diameter-side lateral faces has a small-diameter-side first lateral face located on an inner side of the cage in the radial direction and a small-diameter-side second lateral face located further to an outer side of the cage in the radial direction with respect to the small-diameter-side first lateral face, when a distance between the small-diameter-side first lateral face and the small-diameter-side end face in the first pocket is defined as a third distance, a distance between the small-diameter-side first lateral face and the small-diameter-side end face in the second pocket is a fourth distance larger than the third distance, and a distance between the small-diameter-side second lateral face and the small-diameter-side end face in the second pocket is a fifth distance smaller than the fourth distance.

6. The tapered roller bearing according to claim 1, wherein the cage includes a plurality of large-diameter-side lateral faces respectively facing large-diameter-side end faces of the tapered rollers respectively accommodated in the plurality of pockets, each of the large-diameter-side lateral faces has a large-diameter-side first lateral face located on an outer side of the cage in the radial direction and a large-diameter-side second lateral face located further to an inner side of the cage in the radial direction with respect to the large-diameter-side first lateral face, when a distance between the large-diameter-side first lateral face and the large-diameter-side end face in the first pocket is defined as a sixth distance, a distance between a radially outer end of the large-diameter-side first lateral face and the large-diameter-side end face in the second pocket is a seventh distance larger than the sixth distance, and a distance between the large-diameter-side second lateral face and the large-diameter-side end face in the second pocket is an eighth distance smaller than the seventh distance.

7. The tapered roller bearing according to claim 1, wherein a plurality of the second pockets is spaced from each other in the circumferential direction with the first pocket interposed between the second pockets.

8. A cage for a tapered roller bearing, the tapered roller bearing including an inner ring that has an inner ring raceway provided on an outer peripheral side, a small flange portion provided on a first side of the inner ring raceway in an axial direction, and a large flange portion provided on a second side of the inner ring raceway in the axial direction, the large flange portion having a larger diameter than the small flange portion, an outer ring that has an outer ring raceway on an inner peripheral side, and a plurality of tapered rollers in rolling contact with the inner ring raceway and the outer ring raceway, the cage comprising:

a plurality of pockets for accommodating the tapered rollers;

a plurality of first lateral faces facing outer peripheral surfaces of the tapered rollers respectively accommodated in the plurality of pockets from a first side in a circumferential direction of the cage; and a plurality of second lateral faces facing the outer peripheral surfaces of the tapered rollers accommodated in the plurality of pockets from a second side in the circumferential direction of the cage, wherein the plurality of pockets includes a first pocket which defines a first angle between the first lateral face and the second lateral face, and a second pocket which defines a second angle smaller than the first angle between the first lateral face and the second lateral face, and each of the first angle and the second angle is between a first line and a second line crossing each other, the first line and second line passing through a radially inner end and a radially outer end of the first lateral faces in a cross section of the cage taken along a plane perpendicular to an axial direction of the tapered rollers, the second line passing through a radially inner end and a radially outer end of the second lateral faces in the cross section of the cage.

* * * * *